US008078581B2

(12) United States Patent  
Amaki et al.

(10) Patent No.: US 8,078,581 B2
(45) Date of Patent: Dec. 13, 2011

(54) STORAGE SYSTEM AND REMOTE COPY CONTROL METHOD

(75) Inventors: Kensuke Amaki, Yokohama (JP); Kenichi Oyamada, Yokohama (JP); Takeyuki Imazu, Yokohama (JP); Yoshinori Matsui, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 597 days.

(21) Appl. No.: 12/029,139

(22) Filed: Feb. 11, 2008

(65) Prior Publication Data

US 2009/0132779 A1 May 21, 2009

(30) Foreign Application Priority Data

Nov. 16, 2007 (JP) ................................. 2007-297712

(51) Int. Cl.
*G06F 7/00* (2006.01)
(52) U.S. Cl. ......... 707/648; 711/100; 711/162; 711/167
(58) Field of Classification Search .................. 711/100, 711/162, 167; 707/648
See application file for complete search history.

(56) References Cited

U.S. PATENT DOCUMENTS

| | | | | |
|---|---|---|---|---|
| 5,065,311 A * | 11/1991 | Masai et al. | ..................... | 714/20 |
| 6,463,501 B1 * | 10/2002 | Kern et al. | ..................... | 711/100 |
| 7,076,620 B2 * | 7/2006 | Takeda et al. | ................. | 711/161 |
| 7,130,975 B2 * | 10/2006 | Suishu et al. | ................. | 711/162 |
| 7,152,079 B2 | 12/2006 | Hirakawa et al. | | |
| 7,197,502 B2 * | 3/2007 | Feinsmith | ............................ | 1/1 |
| 7,330,861 B2 * | 2/2008 | Ninose | .......................... | 707/648 |
| 7,418,565 B2 * | 8/2008 | Takeda et al. | ................. | 711/162 |
| 7,624,125 B2 * | 11/2009 | Feinsmith | ............................. | 1/1 |
| 7,694,092 B2 * | 4/2010 | Mizuno | .......................... | 711/162 |
| 7,865,680 B2 * | 1/2011 | Takahashi et al. | ............ | 711/162 |
| 2004/0122796 A1 * | 6/2004 | Akiyama et al. | .................. | 707/1 |
| 2004/0172509 A1 * | 9/2004 | Takeda et al. | ................. | 711/162 |
| 2005/0188253 A1 * | 8/2005 | Kawamura et al. | ............... | 714/6 |
| 2005/0210078 A1 | 9/2005 | Maruyama et al. | | |
| 2006/0069893 A1 | 3/2006 | LeCrone et al. | | |
| 2007/0112893 A1 * | 5/2007 | Okada et al. | .................. | 707/204 |
| 2007/0266212 A1 * | 11/2007 | Uchikado et al. | ............ | 711/162 |
| 2008/0104443 A1 * | 5/2008 | Akutsu et al. | ..................... | 714/6 |

FOREIGN PATENT DOCUMENTS

| | | |
|---|---|---|
| JP | 2005267216 A | 9/2005 |
| JP | 2006107450 A | 4/2006 |
| JP | 2006318491 A | 11/2006 |

* cited by examiner

*Primary Examiner* — Cheyne Ly
(74) *Attorney, Agent, or Firm* — Sughrue Mion, PLLC

(57) ABSTRACT

A plurality of second groups respectively including one or more second volumes are configured in correspondence with each of the first groups of a remote copy source in a remote copy destination, journals are acquired from the first storage apparatus periodically and in the order the journals were created for each of the configured second groups, and the acquired journals are reflected in the corresponding second volume in the corresponding second group. In addition, the latest time stamp of each of the second groups containing the journals retained in the second volume in an unreflected state is compared, the time difference of the latest and oldest time stamps is detected, and prescribed control processing is executed for acquiring the journals regarding the second group with the oldest time stamp in preference to the journals regarding other second groups when the time difference exceeds a preset threshold value.

14 Claims, 20 Drawing Sheets

STORAGE SYSTEM AND REMOTE COPY CONTROL METHOD

CROSS REFERENCES

This application relates to and claims priority from Japanese Patent Application No. 2007-297712, filed on Nov. 16, 2007, the entire disclosure of which is incorporated herein by reference.

BACKGROUND

The present invention relates to a storage system and a remote copy control method, and, for instance, can be suitably applied to a storage system that performs remote copy of data between a storage apparatus installed at an operation base and a storage apparatus installed at a remote base.

Today, remote copy technology is widely used particularly in systems of major corporations and government agencies in order to protect data from major natural disasters such as earthquakes or hurricanes, disasters resulting from acts of human beings such as erroneous operation by the system operator or terrorist attacks, and malfunctions of machinery and programs.

In addition, the data volume handled by businesses in recent years is of an increasing trend, and the number of storage apparatuses subject to remote copy is consequently increasing. Thus, needs for remote copy technology capable of replicating data at a remote base while maintaining the sequencing and consistency of the input and output data in large-scale storage systems are on the rise.

In view of such needs, for example, Japanese Patent Laid-Open Publication No. 2005-267216 (Patent Document 1) and Japanese Patent Laid-Open Publication No. 2006-318491 (Patent Document 2) describe remote copy technology of dividing a plurality of data volumes respectively provided by a plurality of storage apparatuses (hereinafter referred to as the "primary storage apparatus(es)") installed at an operation base into a plurality of groups (hereinafter referred to as the "primary journal group(s)"), dividing a plurality of data volumes respectively provided by a plurality of storage apparatuses (hereinafter referred to as the "secondary storage apparatus(es)") installed at a remote base into a plurality of groups (hereinafter referred to as the "secondary journal group(s)") in correspondence with the foregoing primary journal groups, and performing asynchronous remote copy between the corresponding primary journal group and the secondary journal group.

With the foregoing remote copy technology, when data is written into the data volume of the primary storage apparatus, update history information of the data volume referred to as a journal containing the written data as well as the position and time (time stamp) of the written data is created in the primary storage apparatus.

Meanwhile, the secondary storage apparatus periodically sends a transfer request of the journal (hereinafter referred to as the "journal transfer request") to the corresponding primary storage apparatus. The secondary storage apparatus additionally writes the data contained in the journal transferred from the primary storage apparatus according to the journal transfer request to the corresponding position of the corresponding data volume in the self storage apparatus (this process is hereinafter referred to as "reflecting the journal in the data volume").

Here, at the remote base, a master that is communicable with all other secondary storage apparatus is configured among a plurality of secondary storage apparatuses. The secondary storage apparatus configured as the master acquires the time stamp contained in the latest journal among the journals retained in the respective journal groups configured in the self storage apparatus and the respective journal groups configured in the other secondary storage apparatuses (hereinafter referred to as the "intra-group latest time stamp").

The secondary storage apparatus configured as the master mutually compares the acquired intra-group latest time stamp value of all journal groups, and controls the other secondary storage apparatuses so that the journals up to the time shown with the oldest intra-group latest time stamp are concurrently reflected in the respective secondary data volumes in accordance with such oldest intra-group latest time stamp.

According to this kind of remote copy technology, it is possible to replicate data in a remote base while maintaining the sequencing and consistency of the I/O data from the host across a plurality of journal groups.

Nevertheless, with the remote copy technology disclosed in Patent Document 1 and Patent Document 2, no consideration is given to cases where the data I/O load of the primary storage apparatus is different, and data transfer of the data volume and interval is periodically performed at the same level for the copying between all journal groups. Thus, there is a problem in that journals cannot be completely transferred to the remote base for journal groups having a high data I/O load.

Consequently, according to the foregoing remote copy technology, since the time difference of the latest time stamp will increase between journal groups, there is a problem in that the up-to-dateness of the data copied to a data volume in a journal group with a low data I/O load will be lost.

Although Japanese Patent Laid-Open Publication No. 2006-107450 (Patent Document 3) also discloses remote copy technology for performing data transfer and replication among a plurality of storage apparatuses while maintaining the sequencing, Patent Document 3 does not give any consideration to cases where the data I/O load is different between the primary storage apparatuses as described above.

SUMMARY

When a business system crashes due to a disaster or a failure, it is necessary to replicate data in a state that is closest to the point in time that the system crashed while guaranteeing the consistency of the host I/O in order to recover the system while minimizing the influence from the system crash.

When the consistency of a plurality of journal groups is to be guaranteed, it is necessary to guarantee the sequencing and compatibility of data regarding all business-related journal groups in addition to the inside of the individual journal groups. Each time the number of journal groups to be replicated increases pursuant to the increase in the data volume to be handled in business, due to the problem involving the difference in the data I/O load described above, it is difficult to guarantee the consistency that ensures the up-to-dateness of data with the scope of the conventional technology.

Thus, with a system in which the consistency of a plurality of journal groups is to be guaranteed, each time the number of journal groups increases, it is only possible to recover data from an older point in time when the business system recovers from a failure, and there is a problem in that the RPO (Recovery Point Objective), which is an index showing from what point in time the data can be recovered during the occurrence of a disaster, would deteriorate.

The present invention was made in view of the foregoing points. Thus, an object of the present invention is to propose a highly reliable storage system and remote copy control method capable of improving the RPO during the occurrence of a failure.

In order to achieve the foregoing object, the present invention provides a storage system comprising a first storage unit configured from at least one storage apparatus for providing to a host system a first volume to be used for reading and writing data, and a second storage unit configured from at least one storage apparatus for providing a second volume to be used for replicating data written into the first volume. The first storage unit includes a journal creation unit for configuring a plurality of first groups including the one or more first volumes and, when data is written into the first volume, creating a journal containing the data and a time stamp showing the time the data was written for each of the configured first groups. The second storage unit includes a journal acquisition reflection unit for configuring a plurality of second groups respectively including the one or more second volumes in correspondence with each of the first groups, acquiring the journals from the first storage apparatus periodically and in the order the journals were created for each of the configured second groups, and reflecting the acquired journals in the corresponding second volume in the corresponding second group, a time difference detection unit for comparing the latest time stamp of each of the second groups containing the journals retained in the second volume in an unreflected state, and detecting the time difference of the latest and oldest time stamps, and a journal acquisition control unit for executing prescribed control processing for acquiring the journals regarding the second group with the oldest time stamp in preference to the journals regarding other second groups when the time difference exceeds a preset threshold value.

Thereby, with this storage system, it is possible to guarantee the consistency that ensures the up-to-dateness of data between second groups within a given time frame (threshold value) between the second groups regardless of the number of second groups to be subject to remote copy.

The present invention additionally provides a remote copy control method of a storage system comprising a first storage unit configured from at least one storage apparatus for providing to a host system a first volume to be used for reading and writing data, and a second storage unit configured from at least one storage apparatus for providing a second volume to be used for replicating data written into the first volume. This remote copy control method comprises a first step of configuring a plurality of first groups including the one or more first volumes and, when data is written into the first volume, creating a journal containing the data and a time stamp showing the time the data was written for each of the configured first groups, and a second step of comparing the latest time stamp of each of the second groups containing the journals retained in the second volume in an unreflected state, and detecting the time difference of the latest and oldest time stamps; and executing prescribed control processing for acquiring the journals regarding the second group with the oldest time stamp in preference to the journals regarding other second groups when the time difference exceeds a preset threshold value.

Thereby, with this remote copy control method, it is possible to guarantee the consistency that ensures the up-to-dateness of data between second groups within a given time frame (threshold value) between the second groups regardless of the number of second groups to be subject to remote copy.

According to the present invention, it is possible to realize a highly reliable storage system and remote copy control method capable of improving the RPO during the occurrence of a failure.

DETAILED DESCRIPTION

An embodiment of the present invention is now explained in detail with reference to the attached drawings.

Figure 1:
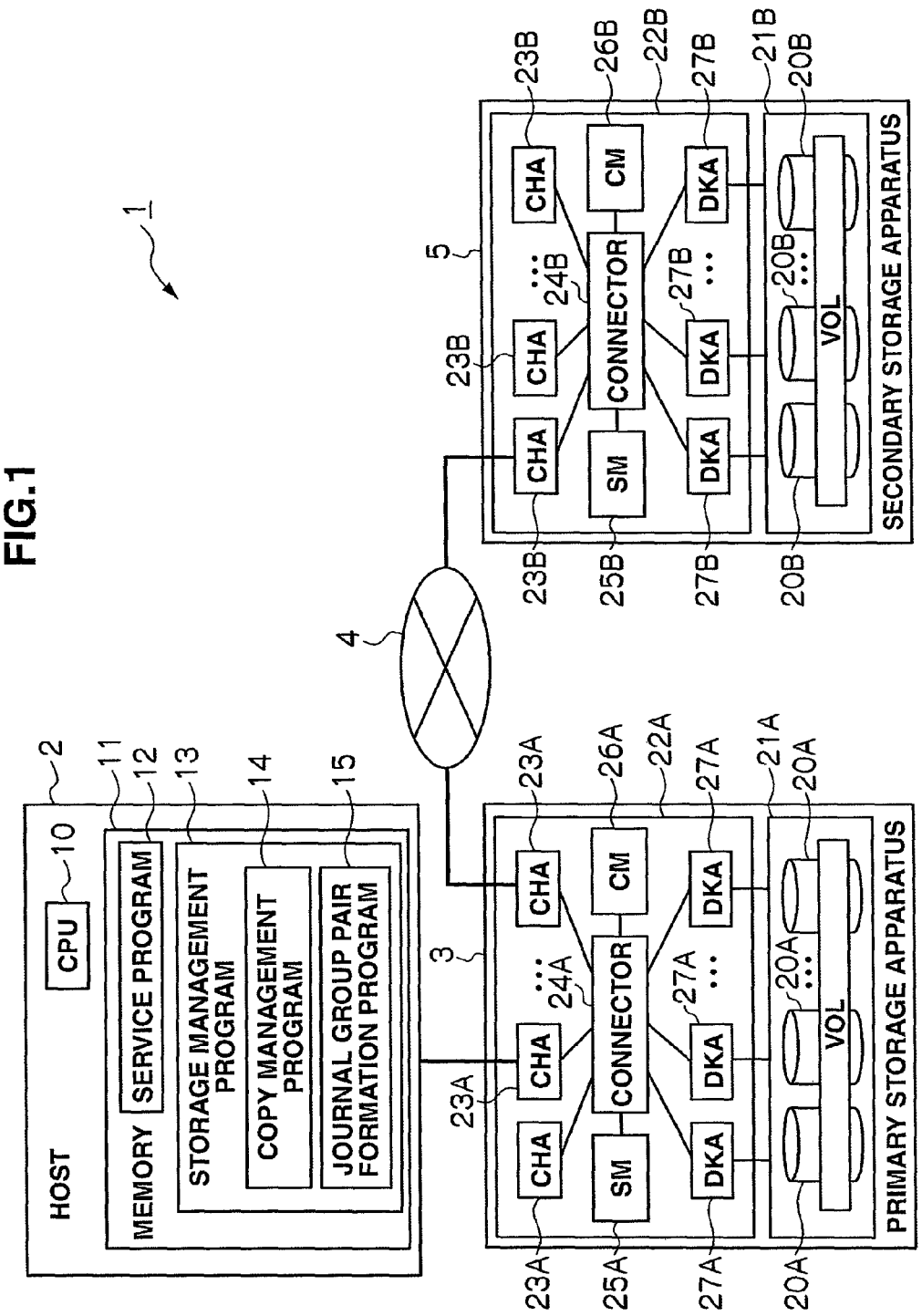
FIG. 1 is a block diagram showing the configuration of a storage system according to the first embodiment.

(1) First Embodiment (1-1) Configuration of Storage System in Present Embodiment FIG. 1 shows the overall storage system 1 according to the first embodiment. The storage system 1 is configured by a host 2 being connected to a primary storage apparatus 3 installed in an operation base, and the primary storage apparatus 3 being connected to a secondary storage apparatus 5 installed in a remote base via a network 4.

The host 2 is configured from a mainframe computer device comprising information processing resources such as a CPU (Central Processing Unit) 10 and a memory 11. The CPU 10 is a processor for governing the operational control of the overall host 2, and performs various types of processing concerning business for the overall host 2 by executing a service program 12 stored in the memory 11. The memory 11 is used for retaining various control programs including the service program 12, as well as a work memory of the CPU 10. The host 2 comprises an information input device (not shown) such as a keyboard, a switch, a pointing device or a microphone, and an information output device (not shown) such as a monitor display or a speaker.

The network 4, for instance, is configured from a SAN (Storage Area Network), a LAN (Local Area Network), the Internet, a public line or a dedicated line. Communication between the host 2 and the primary storage apparatus 3 via the network 4, for example, is conducted according to a fibre channel protocol when the network 4 is a SAN, and conducted according to a TCP/IP (Transmission Control Protocol/Internet Protocol) protocol when the network 4 is a LAN.

The primary storage apparatus 3 and the secondary storage apparatus 5 comprise storage units 21A, 21B mounted with a plurality of storage devices 20A, 20B providing a storage area for storing data to the host 2, and controllers 22A, 22B for controlling the input and output of data to and from the respective storage devices 20A, 20B.

As the storage devices 20A, 20B, for instance, expensive disks such as SCSI (Small Computer System Interface) disks or inexpensive disks such as SATA (Serial AT Attachment) disks or optical disks may be used. Incidentally, as the storage devices 20A, 20B, semiconductor memories such as flash memories may also be used.

The respective storage devices 20A, 20B are operated by the controllers 22A, 22B according to a RAID (Redundant Array of Inexpensive Disks) format. One or more logical volumes (hereinafter referred to as the "logical volumes") VOL are set in a physical storage area provided by one or more storage devices 20A, 20B. Data from the host 2 is stored in units of blocks of a prescribed size (hereinafter referred to as the "logical blocks") in the logical volume VOL.

Each logical volume VOL is given a unique identifier (hereinafter referred to as the "LUN (Logical Unit Number)"). In the case of this embodiment, the input and output of data is conducted by setting the combination of this LUN and a number unique to the logical block (LBA: Logical Block Address) to be allocated to the respective logical blocks as the address, and designating such address.

Figure 2:
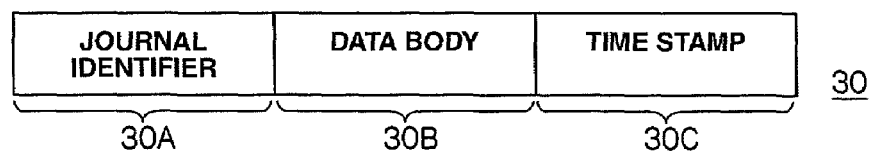
FIG. 2 is a conceptual diagram explaining a journal.

In the case of this embodiment, as attributes of the logical volume VOL to be set in the primary storage apparatus 3 or the secondary storage apparatus 5, there are a data volume for the host 2 to read and write data, and a journal volume for retaining journals. Here, a journal is update history information of the data volume as described above, and, as shown in FIG. 2, is configured from a journal identifier 30A including a sequence number for each journal group allocated to the journal 30, a data 30B written into the data volume at such time, and a time stamp 30C representing the time that the data 30B was stored in the data volume.

Meanwhile, the controllers 22A, 22B comprise a plurality of channel adapters 23A, 23B, connectors 24A, 24B, shared memories 25A, 25B, cache memories 26A, 26B, and a plurality of disk adapters 27A, 27B.

Each channel adapter 23A, 23B is configured as a microcomputer system comprising a microprocessor, a memory, and a communication interface, and comprises a port for connecting to the host 2 and the network 4. The channel adapters 23A, 23B interpret and execute various commands sent from the host 2 and various commands sent from the primary storage apparatus 3 or the secondary storage apparatus 5. The port of each channel adapter 23A, 23B is allocated with a network address (for instance, an IP address or WWN) for identifying the respective channel adapters 23A, 23B, and the respective channel adapters 23A, 23B are thereby able to individually function as a NAS (Network Attached Storage).

The connectors 24A, 24B are connected to the channel adapters 23A, 23B, the shared memories 25A, 25B, the cache memories 26A, 26B, and the disk adapters 27A, 27B. The transfer of data and commands among the channel adapters 23A, 23B, the shared memories 25A, 25B, the cache memories 26A, 26B, and the disk adapters 27A, 27B is conducted via the connectors 24A, 24B. The connectors 24A, 24B are configured from a switch such as an ultrafast crossbar switch or a bus for performing data transfer by way of high speed switching.

The shared memories 25A, 25B and the cache memories 26A, 26B are storage memories to be shared by the channel adapters 23A, 23B and the disk adapters 27A, 27B. The shared memories 25A, 25B are primarily used for storing various types of control information such as the system configuration information and commands concerning the configuration of the overall self storage apparatus. The cache memories 26A, 26B are primarily used for temporarily storing data to be input and output to and from the self storage apparatus.

Each disk adapter 27A, 27B is configured as a microcomputer system comprising a microprocessor, a memory and the like, and functions as an interface for performing protocol control during the communication with the respective storage devices 20A, 20B in the storage units 21A, 21B. The disk adapters 27A, 27B also control the corresponding storage devices 20A, 20B according to the read/write request from the host 2, and read and write the requested data from and into the corresponding storage devices 20A, 20B.

(1-2) Remote Copy Control Function of Present Embodiment

The remote copy control function according to the present embodiment loaded in the secondary storage apparatus 5 is now explained.

Figure 3:
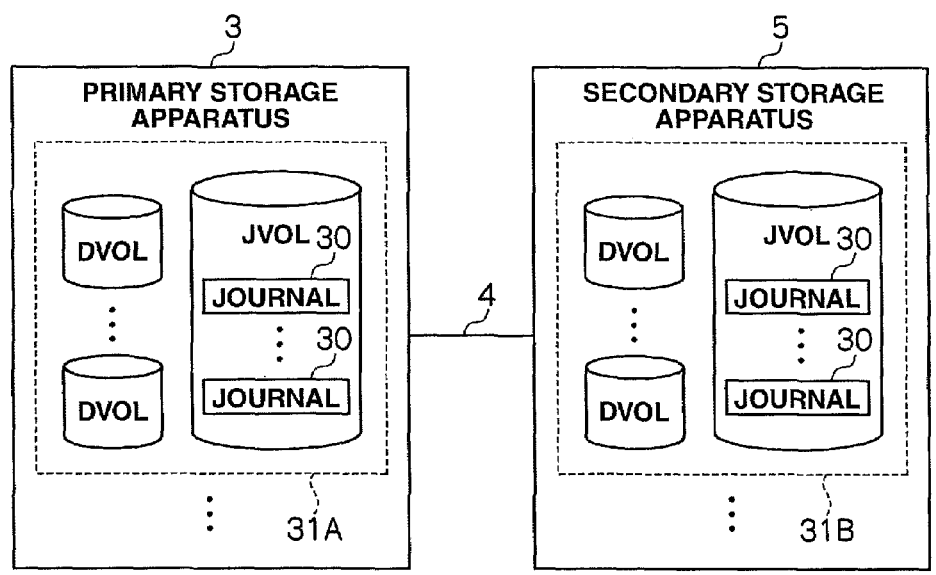
FIG. 3 is a conceptual diagram explaining a journal group.

FIG. 3 shows a configuration example of a primary journal group 31A configured in the primary storage apparatus 3 and a secondary journal group 31B configured in a secondary storage apparatus 5. As evident from FIG. 3, the primary journal group 31A and the secondary journal group 31B respectively comprise one or more data volumes DVOL, and one journal volume JVOL for storing the journals 30 created based on the data written into the data volumes DVOL.

A plurality of primary journal groups 31A are configured in the primary storage apparatus 3, and a plurality of secondary journal groups 31B are configured in the secondary storage apparatus 5 in correspondence with the respective primary journal groups 31A. In addition, data volumes DVOL and journal volumes JVOL are defined in the secondary journal group 31B in correspondence with the respective data volumes DVOL and journal volumes JVOL in the primary journal group 31A.

When the primary storage apparatus 3 is given a write request to the data volume DVOL in the self storage apparatus and the data to be written from the host 2, it creates a journal 30 of the foregoing data and reflects the created journal 30 in the corresponding data volume DVOL. The primary storage apparatus 3 further stores the journal 30 in a journal volume JVOL of the primary journal group 31A which also includes the data volume DVOL to which the journal 30 was reflected.

Meanwhile, the secondary storage apparatus 5 periodically sends to the primary storage apparatus 3 a journal transfer request designating a journal identifier regarding the respective secondary journal groups 31B configured in the self storage apparatus. When the primary storage apparatus 3 is given the journal transfer request, it reads the designated journal 30 from the journal volume JVOL in the corresponding primary journal group 31A, and transfers this to the secondary storage apparatus 5.

The secondary storage apparatus 5 stores the journal 30 transferred from the primary storage apparatus 3 in the journal volume JVOL of the corresponding secondary journal group 31B, and reflects the journal 30 in the corresponding data volume DVOL in the secondary journal group 31B. Thereby, the data written into the data volume DVOL of the primary storage apparatus 3 will be replicated in the corresponding data volume DVOL in the secondary storage apparatus 5.

Meanwhile, in parallel with the foregoing remote copy processing, the secondary storage apparatus 5 confirms the intra-group latest time stamp in the respective secondary journal groups 31B in given intervals (hereinafter referred to as the "inter-group time difference checking interval").

When the time difference of the intra-group latest time stamp of the respective secondary journal groups 31B exceeds a predetermined threshold value (hereinafter referred to as the "inter-group time difference threshold value"), the secondary storage apparatus 5 discontinues the journal transfer regarding the secondary journal groups 31B other than the secondary journal group 31B with the most delayed journal transfer (that is, the secondary journal group 31B with the oldest intra-group latest time stamp).

In addition, while the journal transfer regarding the other secondary journal groups 31B is being discontinued, the secondary storage apparatus 5 uses the line exclusively to acquire the journals regarding the secondary journal group 31B with the most delayed journal transfer in the amount of a preset time amount (hereinafter referred to as the "journal transfer time amount").

The secondary storage apparatus 5 thereafter concurrently reflects the journals 30 up to the time shown with the oldest intra-group latest time stamp in the respective secondary data volumes 31B in accordance with the oldest intra-group latest time stamp among the intra-group latest time stamps of the respective secondary journal groups 31B.

As a means for performing the foregoing remote copy control processing, the memory 11 of the host 2, as shown in FIG. 1, stores a storage management program 13 configured from a copy management program 14 and a journal group pair formation program 15.

The copy management program 14 is a control program for controlling and operating the remote copy between the primary storage apparatus 3 and the secondary storage apparatus 5. The journal group pair formation program 15 is a control program for the system administrator to configure the intended primary journal group 31A or secondary journal group 31B in the primary storage apparatus 3 and the secondary storage apparatus 5, and designate the foregoing inter-group time difference threshold value, the inter-group time difference detection cycle, the journal acquisition time amount, and the like.

Figure 4:
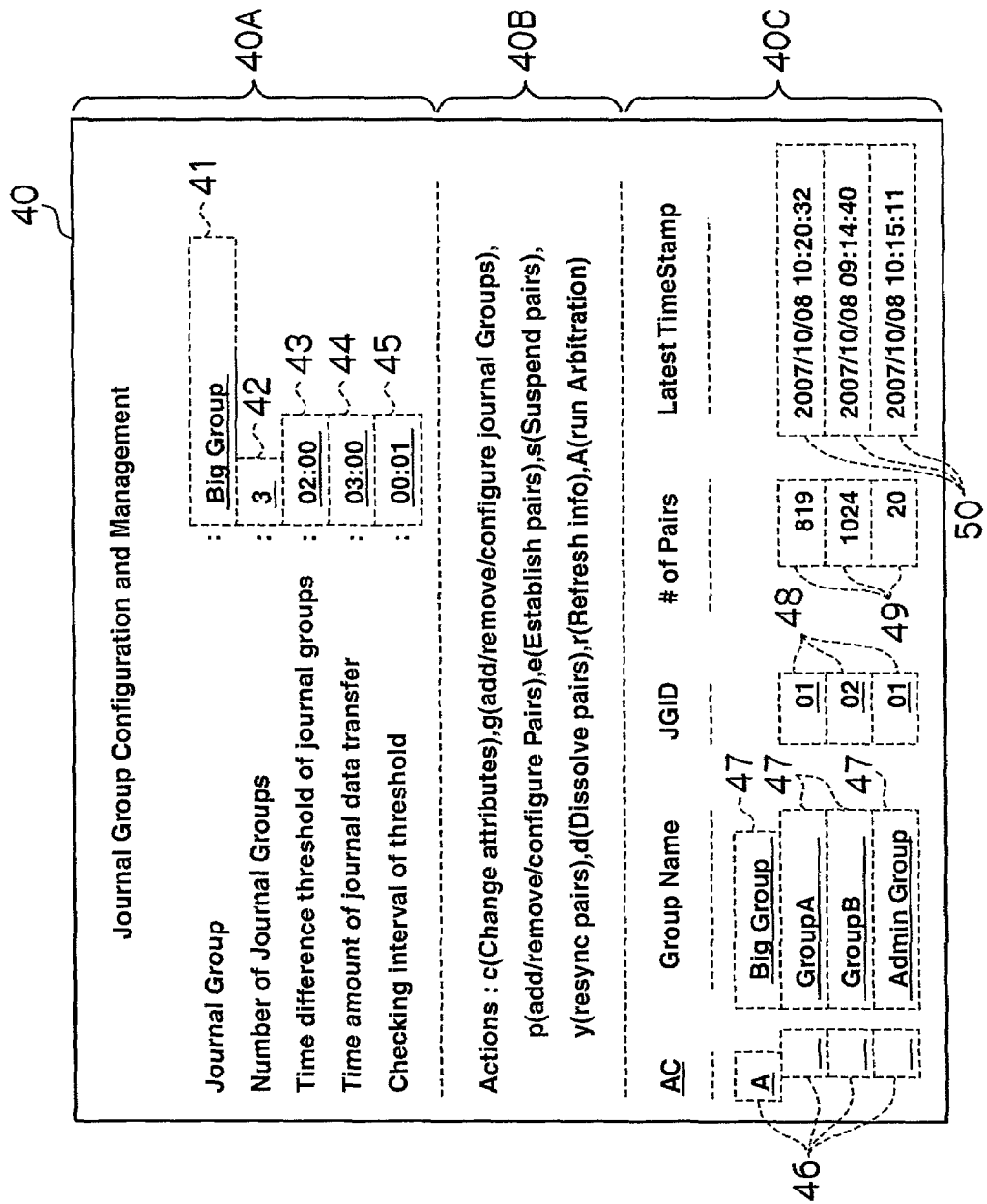
FIG. 4 is a schematic diagram schematically showing a configuration example of a journal group configuration/management screen according to the first embodiment.

As a result of activating the journal group pair formation program 15, the system administrator is able to display a journal group configuration/management screen 40 as shown in FIG. 4 on the monitor display of the host 2.

The journal group configuration/management screen 40 is a GUI (Graphical User Interface) screen to be used for configuring and managing the primary journal group 31A and the secondary journal group 31B, and is configured from a journal group configuration field 40A, an implementable action display field 40B, and a primary journal group list display field 40C.

Among the above, the journal group configuration field 40A is a field for setting the outline concerning an aggregate (aggregate of a plurality of primary journal groups 31A subject to the guarantee of consistency the ensures the up-to-dateness of data; hereinafter referred to as the "journal group aggregate") of the primary journal groups 31A to become the processing unit of the foregoing remote copy processing or displaying the previously set outline, and is provided with a journal group aggregate name field 41, a total journal group display field 42, a group time difference threshold value field 43, a journal transfer time amount field 44, and an inter-group time difference checking interval field 45.

The system administrator is able to designate these items by inputting the intended name in the journal group aggregate name definition field 41, and respectively inputting the intended group time difference threshold value, journal transfer time amount and inter-group time difference checking interval in the group time difference threshold value field 43, the journal transfer time amount field 44 and the inter-group time difference checking interval field 45. The total journal group display field 42 displays the total number of primary journal groups 31A belonging to the target journal group aggregate.

For instance, in the example of FIG. 4, "Big Group" is designated as the name of the journal group aggregate that is currently being targeted, "3" journal groups belong to this journal group aggregate, and "2 minutes ("02:00")" is designated as the group time difference threshold value, "3 minutes ("03:00")" is designated as the journal transfer time amount, and "1 second ("00:01")" is designated as the inter-group time difference checking interval, respectively, regarding the respective primary journal groups 31A belonging to that journal group aggregate.

The implementable action display field 40B displays the processing (action) that can be executed to the respective primary journal groups 31A belonging to the target journal group aggregate displayed as a list in the primary journal group list display field 40C described later.

For instance, the example of FIG. 4 shows that the processing for changing the journal group aggregate to which the primary journal group 31A belongs ("c(Change attributes)"), adding or removing the primary journal group 31A to or from the journal group aggregate, or changing the configuration of the primary journal group 31A ("g(add/remove/configure journal Groups)") regarding the primary journal group 31A displayed as a list on the primary journal group list display field 40C can be performed.

In addition, the primary journal group list display field 40C displays a list of the primary journal groups 31A belonging to the target journal group aggregate. In this primary journal group list display field 40C, the corresponding operation or editing of the journal group aggregate or the primary journal group 31A can be performed by inputting an alphabet (in the example of FIG. 4, "c," "g," "p," "e," "s," "y," "d," "r," "A") associated with the intended processing among the various types of processing displayed in the implementable action display field 40B into the action configuration field 46 associated with the intended primary journal group 31A.

FIG. 4 shows an example where the system administrator selected the execution ("A (run Arbitration)") of the foregoing journal transfer control processing at an intended timing regarding all primary journal groups 31A belonging to the journal group aggregate named "Big group." In the example of FIG. 4, the name of the journal group aggregate or the primary journal group 31A belonging to the journal group aggregate is displayed in the group name field 47, and the group ID given to the primary journal groups 31A is displayed in the journal group ID field 48.

The total pair field 49 displays the number of data volumes DVOL pair-configured in the primary journal group 31A with any one of the data volumes DVOL in the corresponding secondary journal group 31B, and the journal internal latest time stamp field 50 displays the intra-group latest time stamp of the primary journal group 31A collected by the host 2 from the secondary storage apparatus 5 via the primary storage apparatus 3. The system administrator is thereby able to recognize the time difference of the intra-group latest time stamps between the secondary journal groups 31B based on the intra-group latest time stamp of each primary journal group 31A displayed in the latest time stamp field 50.

Figure 5:
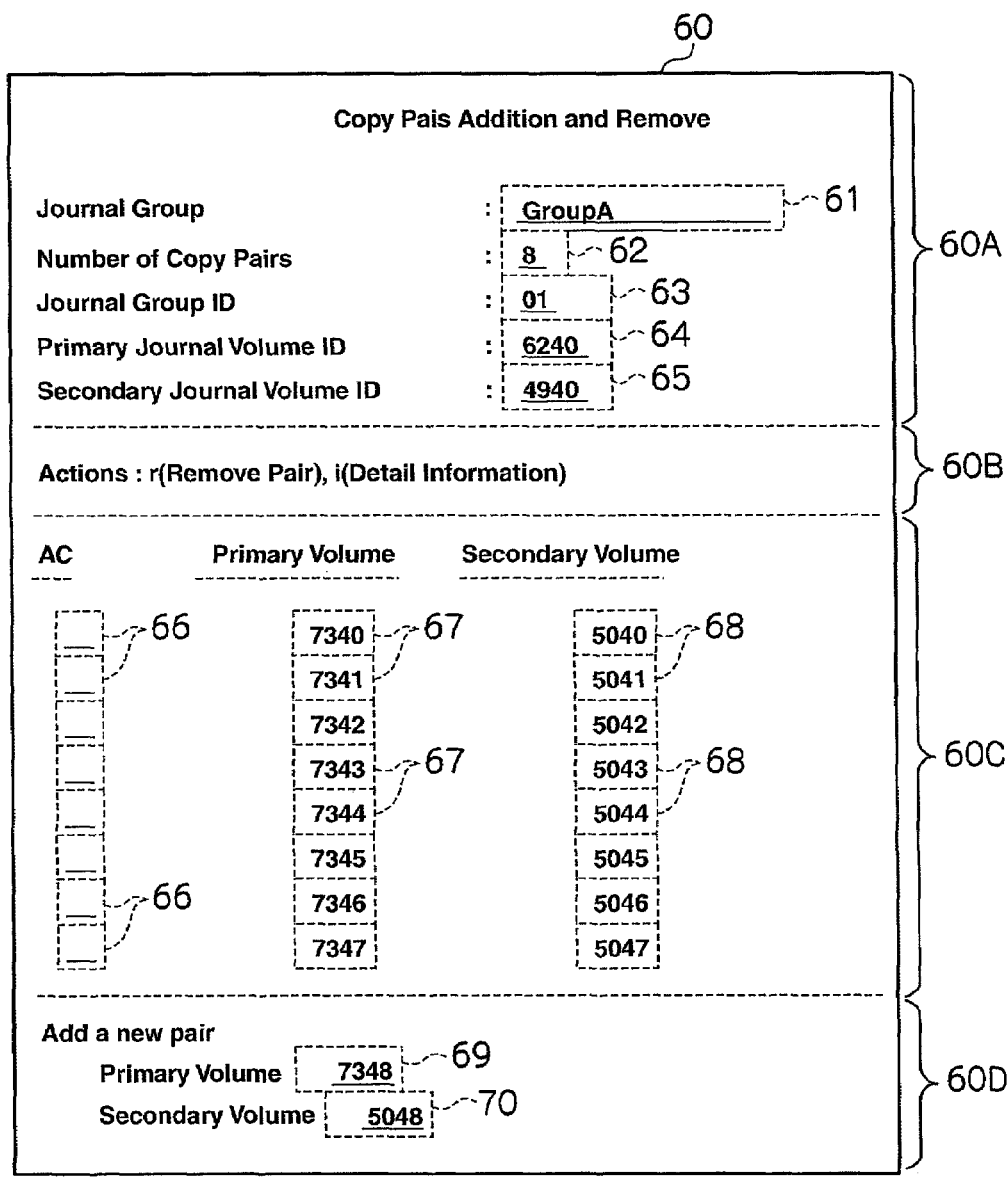
FIG. 5 is a schematic diagram schematically showing a configuration example of copy pair addition/removal screen.

Meanwhile, FIG. 5 shows a copy pair addition/removal screen 60 to be displayed when "g" is sent in any one of the action configuration fields 46 in the primary journal group list display field 40C of the journal group configuration/management screen 40 shown in FIG. 4.

The copy pair addition/removal screen 60 is a GUI screen for creating a new primary journal group 31A in the target journal group aggregate in the journal group configuration/management screen 40 shown in FIG. 4, or adding or removing a data volume DVOL pair (hereinafter referred to as the "copy pair") to perform remote copy to the primary journal group 31A (primary journal group 31A in which "g" was set in the corresponding action configuration field 46 in the primary journal group list display field 40C) selected in the journal group configuration/management screen 40 shown in FIG. 4, and is configured from a journal group information field 60A, an implementable action display field 60B, a copy pair list display field 60C, and a new copy pair definition field 60D.

Among the above, the journal group information field 60A is a field for setting the outline concerning the target primary journal group 31A or displaying the previously set outline, and is provided with a journal group name field 61, a total copy pair display field 62, a journal group ID field 63, a primary journal volume ID field 64, and a secondary journal volume ID field 65.

The journal group name field 61 displays the name of the new primary journal group 31A input by the system administrator, or the name of the existing primary journal group 31A selected in the journal group configuration/management screen 40 shown in FIG. 4.

The total copy pair display field 62 displays the total number of copy pairs belonging to the primary journal group 31A, and the journal group display field 63 displays the group ID given by the system administrator to the new primary journal group 31A or the existing primary journal group 31A.

The primary journal volume ID field 64 displays the volume ID of the primary journal volume JVOL in the new or existing primary journal group 31A, and the secondary journal volume ID field 65 displays the volume ID of the secondary journal volume JVOL in the secondary journal group 31B associated with the new or existing primary journal group 31A.

Accordingly, the example of FIG. 5 shows that the name and group ID of the targeted new or existing primary journal group 31A are respectively "group A (Group A)" and "01," there are "8" data volumes DVOL pair-configured with the data volume DVOL in the secondary journal group 31B corresponding to the primary journal group 31A, the volume ID of the primary journal volume JVOL in the primary journal group 31A is "6240," and the volume ID of the secondary journal volume JVOL in the corresponding secondary journal group 31B is "4940."

The implementable action display field 60B displays the processing (action) that can be executed to the copy pairs displayed as a list in the copy pair list display field 60C described later. For instance, the example of FIG. 5 shows that it is possible to perform the processing of cancelling the copy pairs displayed as a list in the copy pair list display field 60C ("r(Remove Pair")"), and displaying the detailed information of such copy pairs ("i(Detail Information)").

In the copy pair list display field 60C, the volume IDs of the primary data volume DVOL and the secondary data volume DVOL concerning the respective copy pairs in which the primary data volume DVOL belongs to the target primary journal group 31A are respectively displayed in the primary data volume ID field 67 and the secondary data volume ID field 68.

The example of FIG. 5 shows that the primary journal group 31A named "Group A" includes a primary data volume ("P-Volume") having a volume ID of "7340" that is pair-configured with a secondary data volume ("S-Volume") having a volume ID of "5040."

In this copy pair list display field 60C, the corresponding operation or editing can be performed to the copy pair by inputting an alphabet (in the example of FIG. 5, "r" or "i") associated with the intended processing among the various types of processing displayed in the implementable action display field 60A into the action configuration field 66 associated with the intended copy pair.

Meanwhile, the new copy pair definition field 60D is a field for defining a new copy pair to be added to the target primary journal group 31A, and is provided with a primary volume ID input field 69 and a secondary volume ID input field 70.

The system administrator is able to define a new copy pair by inputting the volume ID of the primary data volume DVOL into the primary volume ID input field 69 in the new copy pair definition field 60D, and inputting the volume ID of the secondary data volume DVOL into the secondary volume ID input field 70.

The example of FIG. 5 shows a case of defining, as a new copy pair, a copy pair in which the data volume DVOL having a volume ID of "7348" is primary, and the data volume DVOL having a volume ID of "4950" is secondary.

Figure 6:
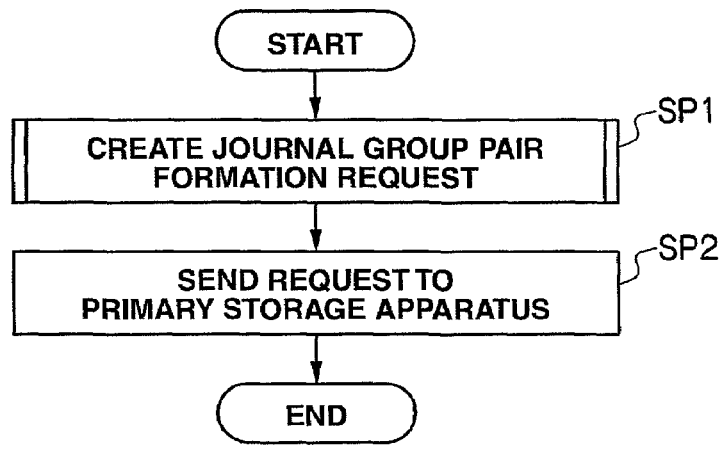
FIG. 6 is a flowchart showing the processing routine of journal group pair formation processing according to the first embodiment.

FIG. 6 shows the specific processing routine of the CPU 10 (FIG. 1) in the host 2 when creating a pair (hereinafter referred to as the "journal group pair") of the primary journal group 31A and the secondary journal group 31B to be subject to remote copy according to the various definitions input in the journal group configuration/management screen 40 and the copy pair addition/removal screen 60. The CPU 10 executes the journal group pair formation processing according to the journal group pair formation program 15 (FIG. 1) stored in the memory 11 (FIG. 1).

Figure 7:
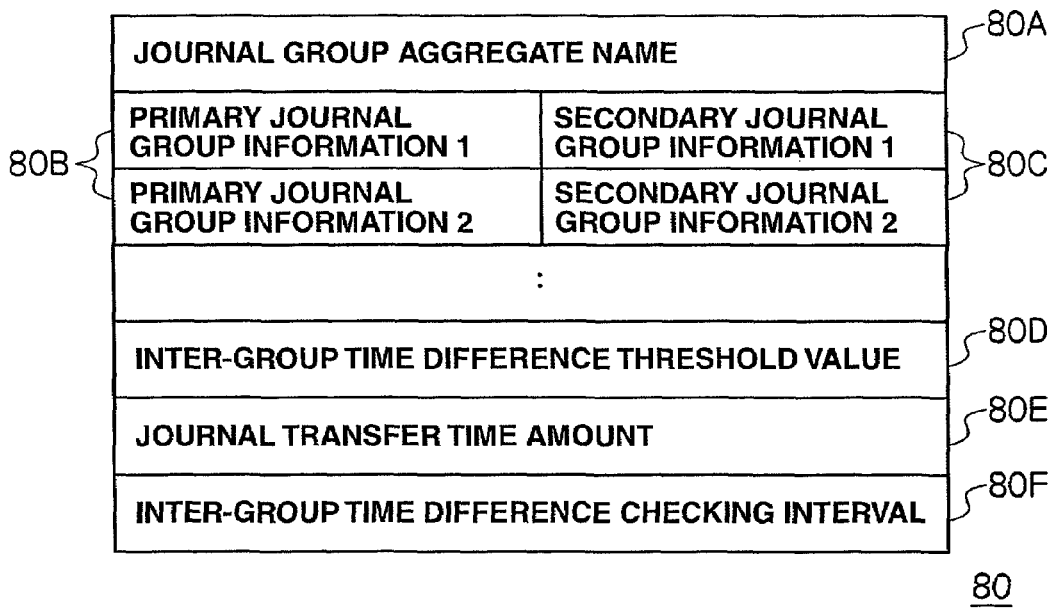
FIG. 7 is a conceptual diagram explaining a journal group pair formation request according to the first embodiment.

In other words, the CPU 10 starts the journal group pair formation processing after necessary information is input by the system administrator via the journal group configuration/management screen 40 explained with reference to FIG. 4 and the copy pair addition/removal screen 60 explained with reference to FIG. 5, and input for configuring the journal group pair is received, and foremost creates a journal group pair formation request 80 as shown in FIG. 7 based on the various types of information input by the system administrator in the journal group configuration/management screen 40 (SP1).

Subsequently, the CPU 10 sends the created journal group pair formation request 80 to the primary storage apparatus 3 (SP2), and then ends this journal group pair formation processing.

Figure 9:
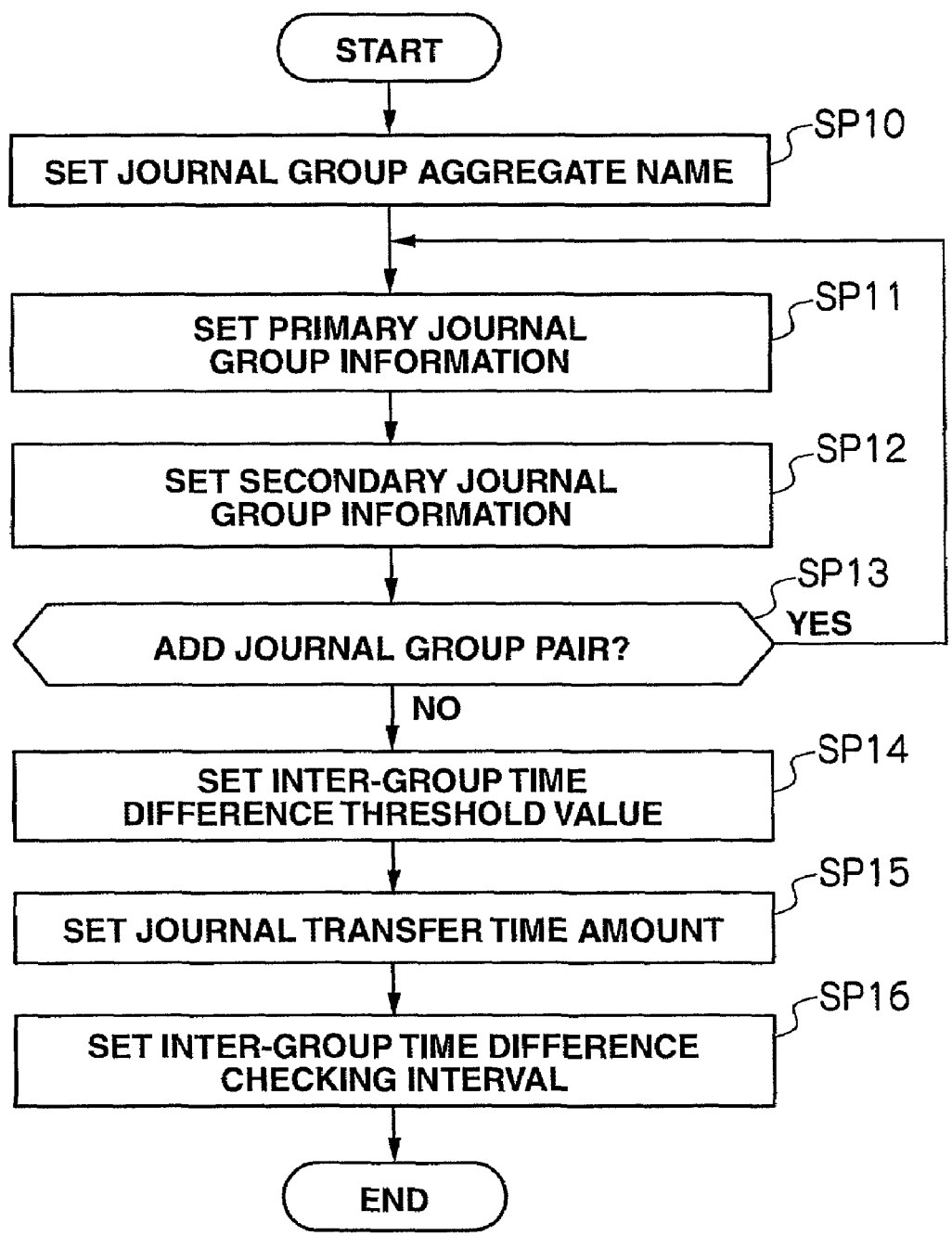
FIG. 9 is a flowchart showing the processing routine of journal group pair formation request creation processing according to the first embodiment.

The specific processing contents of the CPU 10 at step SP1 of the journal group pair formation processing are shown in FIG. 9. When the CPU 10 proceeds to step SP1 of the journal group pair formation processing, it foremost stores the name of the new journal group aggregate defined by the system administrator with the journal group configuration/management screen 40 in the journal group aggregate name storage field 80A of the journal group pair formation request 80 according to the journal group pair formation request creation processing routine shown in FIG. 9 (SP10).

The CPU 10 thereafter stores prescribed management information (hereinafter referred to as the "primary journal group information") concerning one primary journal group 31A belonging to the journal group aggregate defined with the journal group configuration/management screen 40 in the primary journal group information storage field 80B of the journal group pair formation request 80 (SP11).

Subsequently, the CPU 10 stores prescribed management information (secondary journal group information) concerning the secondary journal group 31B configuring the journal group pair together with the primary journal group 31A in the secondary journal group information storage field 80C associated with the primary journal group information storage field 80A in the journal group pair formation request 80 (SP12).

The CPU 10 thereafter determines whether the primary journal group information and the secondary journal group information concerning all journal group pairs defined in the journal group configuration/management screen 40 have been completely stored in the primary journal group information storage field 80B and the secondary journal group information storage field 80C of the journal group pair formation request 80 (SP13).

If the CPU 10 obtains a negative result in this determination, it returns to step SP11, and thereafter repeats the same processing regarding the remaining journal group pairs defined in the journal group configuration/management screen 40 (SP11 to SP13-SP11).

When the CPU 10 completes the same processing regarding all journal group pairs defined in the journal group configuration/management screen 40, it respectively stores the inter-group time difference threshold value, the journal transfer time amount and the inter-group time difference checking interval set in the journal group configuration/management screen 40 into the inter-group time difference threshold value storage field 80D, the journal transfer time amount storage field 80E and the inter-group time difference checking interval storage field 80F of the journal group pair formation request 80 (SP14 to SP16). The CPU 10 thereafter ends this journal group pair formation request creation processing.

Figure 8:
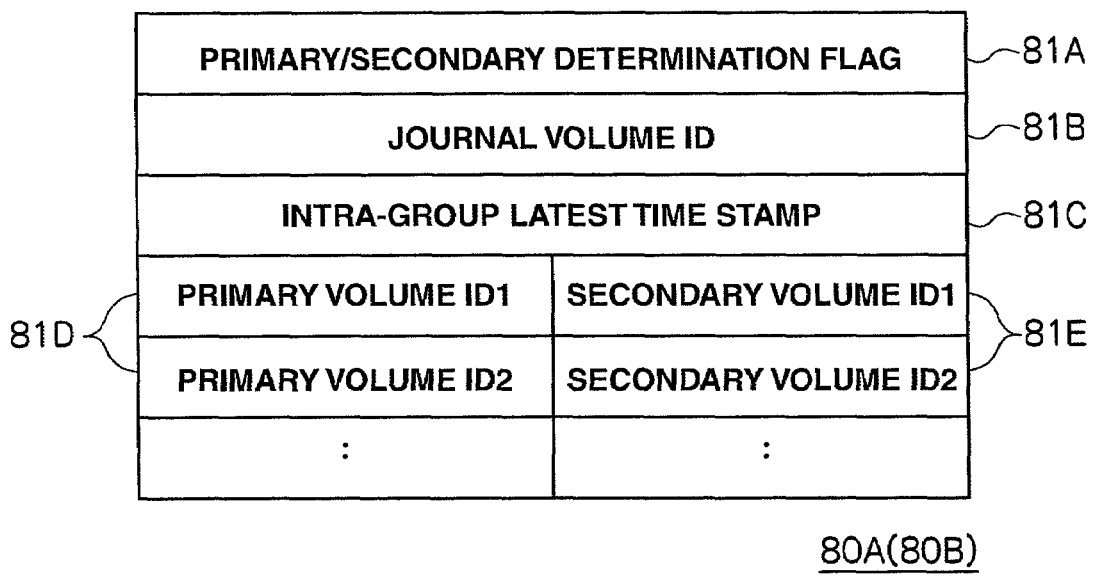
FIG. 8 is a conceptual diagram explaining primary journal group information and secondary journal group information.

A specific example of the primary journal group information and the secondary journal group information is shown in FIG. 8. As evident from FIG. 8, the primary journal group information and the secondary journal group information are configured from a primary/secondary determination flag 81A representing whether the journal group is primary or secondary, a volume ID 81B of the journal group JVOL in the primary journal group 31A and the secondary journal group 31B, an intra-group latest time stamp 81C of the primary journal group 31A or the secondary journal group 31B, and a volume ID 81D of the primary data volume DVOL and a volume ID 81E of the secondary data volume DVOL respectively configuring the respective copy pairs defined regarding the primary journal group 31A or the secondary journal group 31B. Nevertheless, the intra-group latest time stamp 81C is information to be updated by the secondary storage apparatus 5 as described later each time it receives a journal 30 regarding the secondary journal group 31B from the primary storage apparatus 3, and invalid data is stored as the intra-group latest time stamp 81C in the journal group pair formation request 80.

Figure 10:
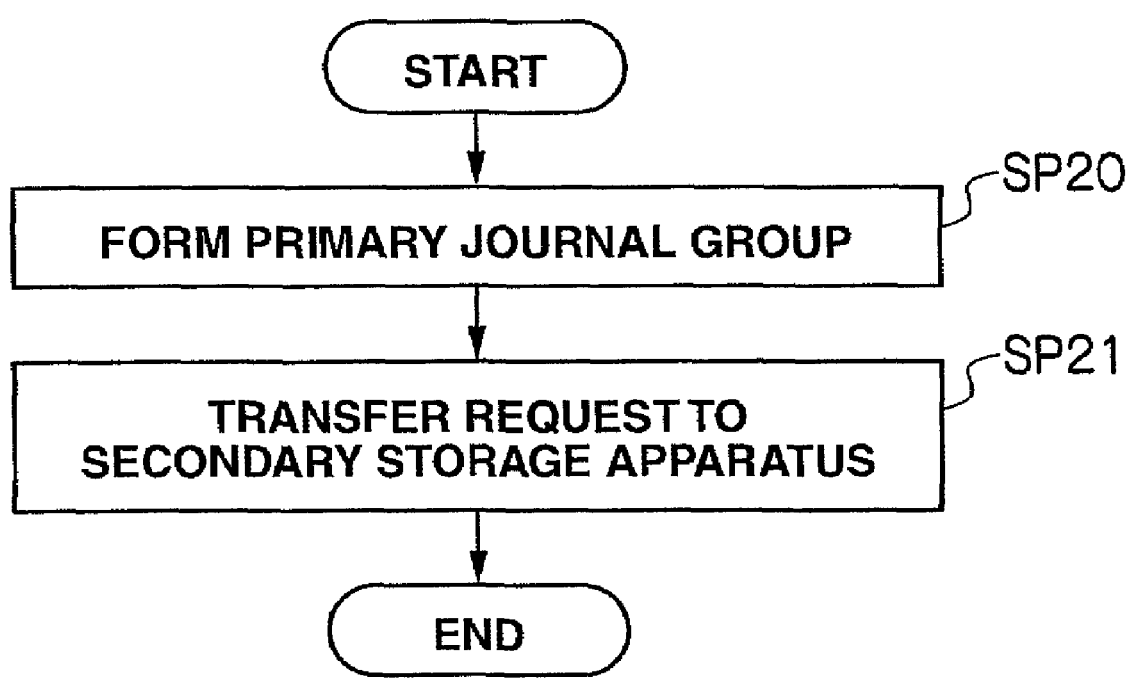
FIG. 10 is a flowchart showing the processing routine of primary journal group formation processing.

Meanwhile, the channel adapter 23A of the primary storage apparatus 3 that received the journal group pair formation request 80 executes the primary journal group formation processing shown in FIG. 10 according to the copy processing program stored in an internal memory not shown.

In other words, when the channel adapter 23A receives the journal group pair formation request 80, it starts the primary journal group formation processing, and foremost reads the name of the target journal group aggregate to be created stored in the journal group aggregate name storage field 80A of the received journal group pair formation request 80, and the primary journal group information of the respective primary journal groups 31A belonging to the journal group aggregates stored in the respective primary journal group information fields 80B, and forms all necessary primary journal groups 31A based on the read primary journal group information (SP20).

Specifically, the channel adapter 23A respectively forms the necessary primary journal groups 31A by creating necessary data volumes DVOL and journal volumes JVOL and associating the data volumes DVOL and the journal volumes JVOL based on the primary journal group information read from the respective primary journal group information fields 80B of the received journal group pair formation request 80 at step SP20.

Subsequently, the channel adapter 23A transfers the journal group pair formation request 80 to all secondary storage apparatuses 5 to be formed with the secondary journal groups 31B configuring the journal group pair together with the respective primary journal groups 31A formed at step SP1 (SP21). The channel adapter 23A thereafter ends this primary journal group formation processing.

Figure 11:
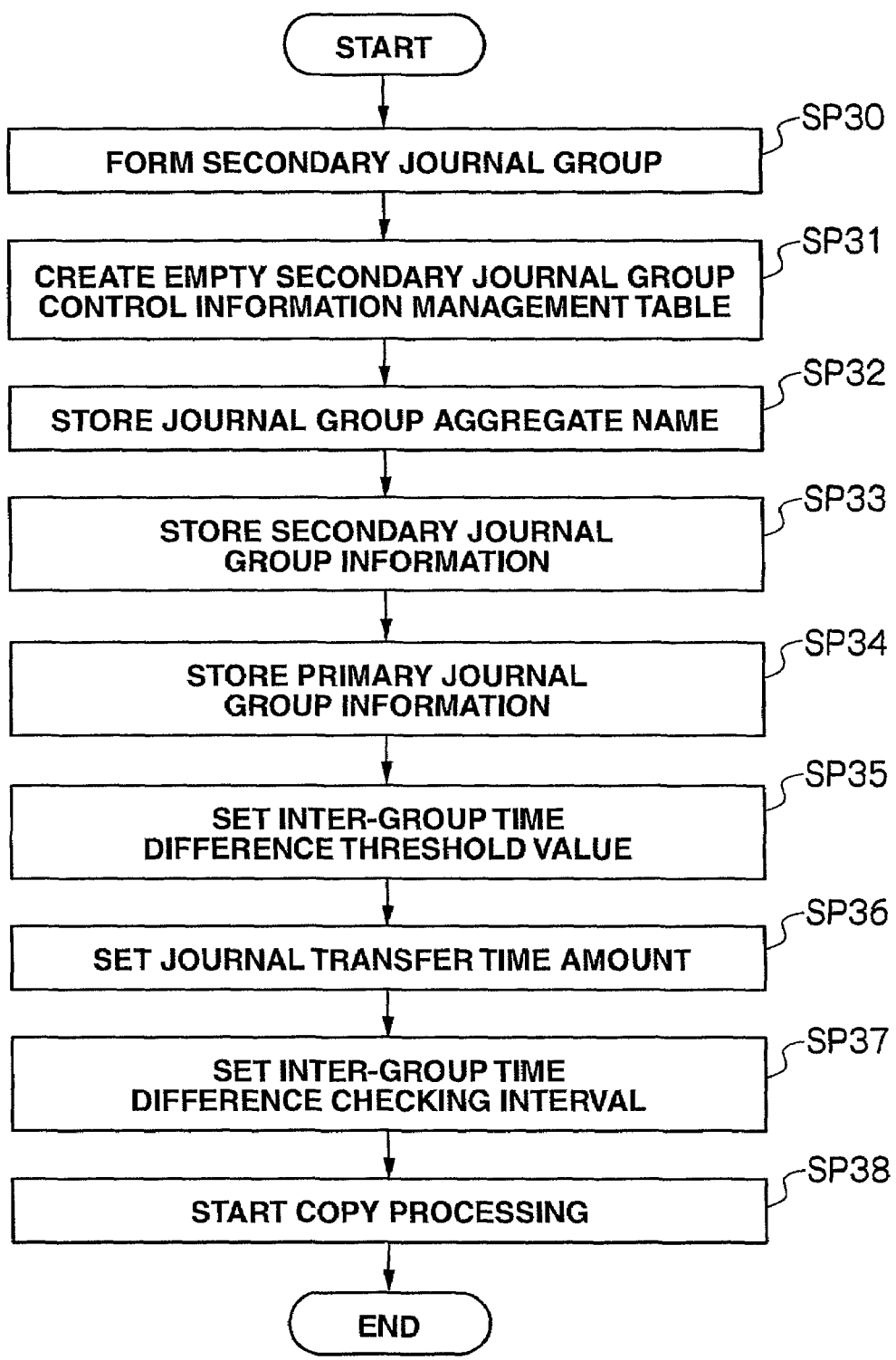
FIG. 11 is a flowchart showing the processing routine of secondary journal group formation processing according to the first embodiment.

Meanwhile, the channel adapter 23B of the secondary storage apparatus 5 that received the journal group pair formation request 80 executes the secondary journal group formation processing shown in FIG. 11 according to the copy processing program stored in an internal memory not shown.

In other words, when the channel adapter 23B receives the journal group pair formation request 80 transferred from the primary storage apparatus 3, it starts the secondary journal group formation processing, and foremost reads the secondary journal group information stored in the respective secondary journal group information fields 80C of the received journal group pair formation request 80, and forms all necessary secondary journal groups 31B based on the read secondary journal group information (SP30). Since the specific processing contents of the channel adapter 23B at step SP30 are the same as the processing contents of the channel adapter 23A explained with reference to step SP20 of FIG. 10, the detailed explanation thereof is omitted.

Figure 12:
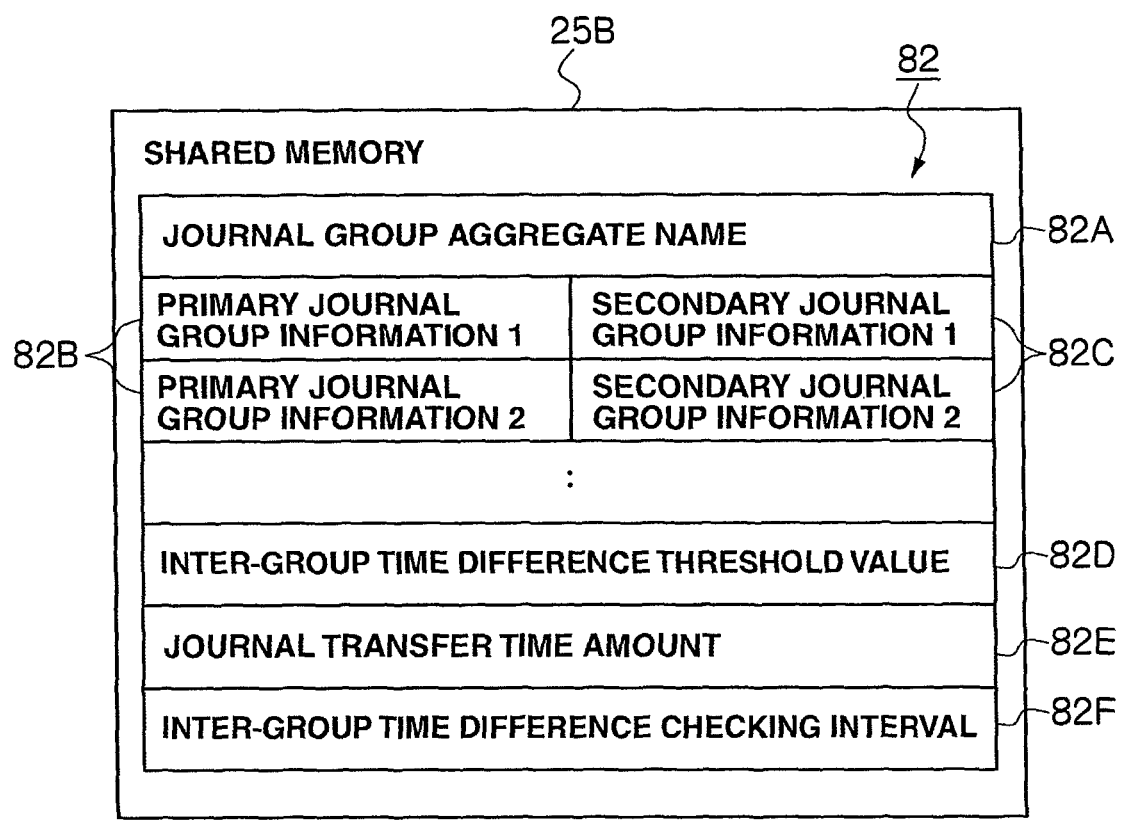
FIG. 12 is a conceptual diagram showing a secondary journal group control information management table according to the first embodiment.

Subsequently, the channel adapter 23B creates a secondary journal group control information management table 82 as shown in FIG. 12 that is not storing data in the shared memory 25B (SP31). The secondary journal group control information management table 82 is a table for managing the secondary journal group 31B created by the secondary storage apparatus 5 in the self storage apparatus, and is configured from a journal group aggregate name storage field 82A, one or more primary journal group information fields 82B, a secondary journal group information field 82C, an inter-group time difference threshold value storage field 82D, a journal transfer time amount storage field 82E, and an inter-group time difference checking interval storage field 82F.

The channel adapter 23B thereafter stores the name of the corresponding journal group aggregate contained in the journal group pair formation request 80 into the journal group aggregate name storage field 82A of the secondary journal group control information management table 82 (SP32).

Subsequently, the channel adapter 23B stores each piece of secondary journal group information contained in the journal group pair formation request 80 into the secondary journal group information field 82C of the secondary journal group control information management table 82 (SP33), and stores each piece of primary journal group information contained in the journal group pair formation request 80 corresponding primary journal group information field 82B of the secondary journal group control information management table 82 (SP34).

The channel adapter 23A thereafter stores the information of the inter-group time difference threshold value, the journal transfer time amount and the inter-group time difference checking interval contained in the journal group pair formation request 80 in the inter-group time difference threshold value storage field 82D, the journal transfer time amount storage field 82E and the inter-group time difference checking interval storage field 82F of the secondary journal group control information management table 82 (SP35 to SP37).

Subsequently, the channel adapter 23B starts the remote copy processing regarding the respective secondary journal groups 31B formed at step SP30 (SP38), and thereafter ends the secondary journal group formation processing.

When the channel adapter 23B starts the remote copy processing, it periodically sends to the primary storage apparatus 3 a journal transfer request designating a journal identifier (sequence number) regarding the respective secondary journal groups 31B, and reflects the journal 30 consequently transferred from the primary storage apparatus 3 in the corresponding data volume DVOL of the corresponding secondary journal group 31B.

Each time the channel adapter 23B receives a journal 30 from the primary storage apparatus 3, it updates the value of the intra-group latest time stamp 81C in the corresponding secondary journal group information of the secondary journal group control information management table 82 with the value of the time stamp stored in the acquired journal 30.

Figure 13:
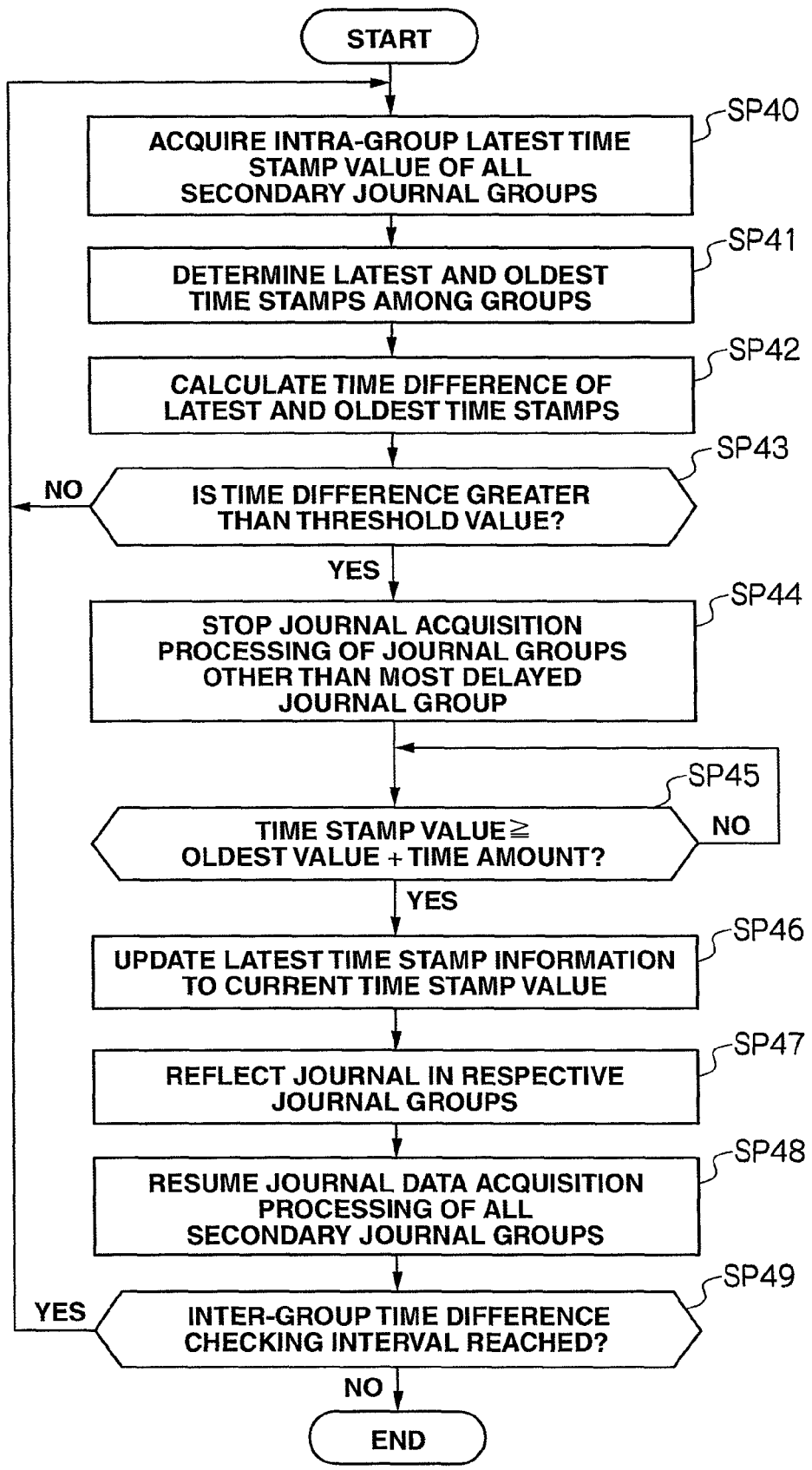
FIG. 13 is a flowchart showing the processing routine of journal transfer control processing according to the first embodiment.

Meanwhile, in parallel with the foregoing remote copy processing, the channel adapter 23B executes the journal transfer control processing shown in FIG. 13 regarding the respective journal group aggregates according to the journal transfer control processing program stored in an internal memory not shown.

In other words, the channel adapter 23B starts the journal transfer control processing in the cycle of the inter-group time difference checking interval, and foremost reads the intra-group latest time stamp 81C (FIG. 8), in the secondary journal group information corresponding to the secondary journal groups 31B in the secondary journal group control information management table 82 (FIG. 8) regarding the respective secondary journal groups 31B associated with the target journal group aggregate (SP40).

Subsequently, the channel adapter 23B compares the intra-group latest time stamp values of the respective secondary journal groups 31B acquired at step SP40 so as to determine the oldest intra-group latest time stamp (hereinafter referred to as the "intra-group oldest time stamp") and the latest intra-group latest time stamp (hereinafter referred to as the "inter-group latest time stamp") in the target journal group aggregate (SP41).

The channel adapter 23B thereafter calculates the time difference between the intra-group oldest time stamp and the inter-group latest time stamp determined at step SP41 (SP42), and determines whether this time difference is greater than the inter-group time difference threshold value stored in the secondary journal group control information management table 82 (SP43).

When the channel adapter 23B obtains a negative result in this determination, it returns to step SP40, and thereafter repeats the same processing until it obtains a positive result at step SP43 (SP40 to SP43-SP40).

When the channel adapter 23B obtains a positive result in this determination, it discontinues the journal transfer regarding the secondary journal groups 31B other than the secondary journal group 31B with the most delayed journal transfer (that is, the secondary journal group 31B with the oldest intra-group latest time stamp) (SP44).

The channel adapter 23B thereafter updates the value of the intra-group latest time stamp contained in the secondary journal group information of the secondary journal group 31B stored in the secondary journal group control information management table 82 with the value of the time stamp contained in the journal 30 each time it acquires the journal 30 regarding the secondary journal group 31B with the most delayed journal transfer, and at the same time waits for the value of the intra-group latest time stamp to become greater than the total value of the value of the intra-group oldest time stamp determined at step SP41 and the journal transfer time amount set in the secondary journal group control information management table 82 (SP45).

When the channel adapter 23B eventually obtains a positive result in the determination at step SP45, it updates the value of the intra-group latest time stamp of the secondary journal group 31B in the secondary journal group control information management table 82 with the value of the time stamp contained in the latest journal 30 (SP46).

The channel adapter 23B thereafter concurrently reflects the journals 30 up to the time shown with the intra-group oldest time stamp in the respective secondary data volumes 31B in accordance with a new intra-group latest time stamp among the intra-group latest time stamps of the respective secondary journal groups 31B (SP47).

Subsequently, the channel adapter 23B resumes the acquisition processing of journals 30 regarding all secondary journal groups 31B (SP48), thereafter refers to the secondary journal group control information management table 82, and determines whether the inter-group time difference checking interval has been reached since the start of this journal transfer control processing (SP49).

When the channel adapter 23B obtains a positive result in this determination, it returns to step SP40, and performs step SP40 to step SP49 as with the processing described above. Contrarily, when the channel adapter 23B obtains a negative result in the determination at step SP48, it ends this journal transfer control processing.

(1-3) Effect of Present Embodiment

As described above, with the storage system 1 of the present embodiment, the secondary storage apparatus 5 monitors the intra-group latest time stamp of the respective secondary journal groups 31B for each journal group aggregate, and discontinues the journal transfer regarding the secondary journal groups 31B other than the secondary journal group 31B with the most delayed journal transfer when the time difference exceeds the inter-group time difference threshold value. The secondary storage apparatus 5 thereafter acquires journals 30 regarding the secondary journal group 31B with the most delayed journal transfer from the primary storage apparatus 3 in the amount of the journal transfer time amount, and then reflects this in the journals 30 of the respective secondary journal groups 31B.

Thus, according to the storage system 1, it is possible to guarantee the consistency that ensures the up-to-dateness of data between the respective secondary journal groups 31B within a given time frame (inter-group time difference threshold value) between the secondary journal groups 31B regardless of the number of secondary journal groups 31B to be subject to remote copy, and it is thereby possible to provide a highly reliable storage system.

In addition, with the storage system 1, since the system administrator is able to using the host 2 to set the inter-group time difference checking interval, the inter-group time difference threshold value and the journal transfer time amount, the present invention also yields an effect of improving the operational flexibility in addition to the foregoing effect.

(2) Second Embodiment

Figure 14:
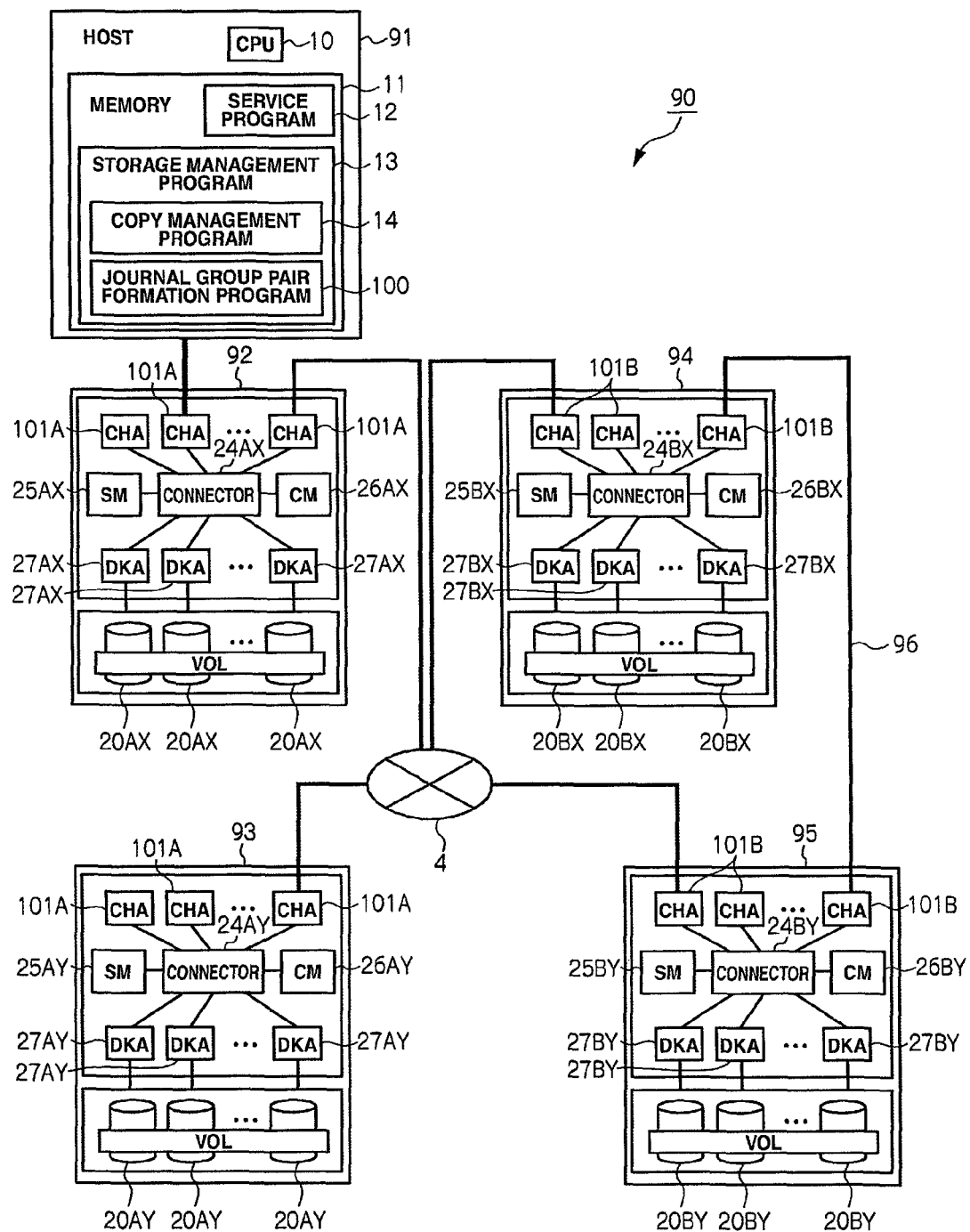
FIG. 14 is a block diagram showing the configuration of a storage system according to the second embodiment.

FIG. 14, which depicts the same reference numerals or the same reference numerals with suffix "X" or "Y" for the components corresponding to FIG. 1, shows a storage system 90 according to the second embodiment. In this storage system 90, first and second primary storage apparatuses 92, 93 installed in an operation base and first and second secondary storage apparatuses 94, 95 installed in a remote base are connected via the network 4. In addition, the first primary storage apparatus 92 is connected to a host 91, and further connected to the first and second secondary storage apparatuses 94, 95 via a communication line 96.

One or more primary journal groups 31A (FIG. 3) are provided in the first primary storage apparatus 92, and one or more secondary journal groups 31B (FIG. 3) are provided in the first secondary storage apparatus 94 in correspondence with the respective primary journal groups 31A. When data is written into any one of the data volumes DVOL in any one of the primary journal groups 31A in the first primary storage apparatus 92, a journal 30 regarding such data is created in the first primary storage apparatus 92, this is transferred to the first secondary storage apparatus 94 via the network 4, and reflected in the corresponding data volume DVOL in the corresponding secondary journal group 31B of the first secondary storage apparatus 94.

Similarly, one or more primary journal groups 31A are provided in the second primary storage apparatus 93, and one or more secondary journal groups 31B are provided in the second secondary storage apparatus 95 in correspondence with the respective primary journal groups 31A. When data is written into any one of the data volumes DVOL in any one of the primary journal groups 31A in the second primary storage apparatus 95, a journal 30 regarding such data is created in the second primary storage apparatus 93, this is transferred to the second secondary storage apparatus 95 via the network 4, and reflected in the corresponding data volume DVOL in the corresponding secondary journal group 31B of the second secondary storage apparatus 95.

In the foregoing case, with the storage system 90 according to the present embodiment, either the first or second secondary storage apparatus 94, 95 designated by the system administrator among the first and second secondary storage apparatuses 94, 95 is set to be the master, and confirms the intra-group latest time stamp of the corresponding secondary journal group 31B in the self storage apparatus and the respective intra-group latest time stamps of the corresponding secondary journal group 31B in the other second or first secondary storage apparatus 95, 94 for each journal group aggregate according to a prescribed inter-group time difference checking interval.

If the time difference between the intra-group oldest time stamp and the inter-group latest time stamp between the respective secondary journal groups 31B exceeds a predetermined inter-group time difference threshold value, the first or second secondary storage apparatus 94, 95 as the master controls the other second or first secondary storage apparatus 95, 94 as necessary, and thereby discontinues or causes to be discontinued the journal transfer regarding the secondary journal groups 31B other than the secondary journal group 31B with the most delayed journal transfer.

In addition, while the journal transfer regarding the other secondary journal groups 31B other than the secondary journal group 31B with the most delayed journal transfer is being discontinued, the first or second secondary storage apparatus 94, 95 as the master uses or causes to be used the line exclusively to acquire or causes to be acquired the journals regarding the secondary journal group 31B with the most delayed journal transfer in the amount of a preset time amount from the corresponding first or second primary storage apparatus 92, 93.

As a means for performing the foregoing remote copy control processing, the memory 11 of the host 91, as shown in FIG. 14, stores a journal group pair formation program 100 as a control program for the system administrator to configure the journal group pair, and setting the secondary storage apparatus as the master in addition to the inter-group time difference threshold value, the inter-group time difference detection cycle and the journal acquisition time amount.

Figure 15:
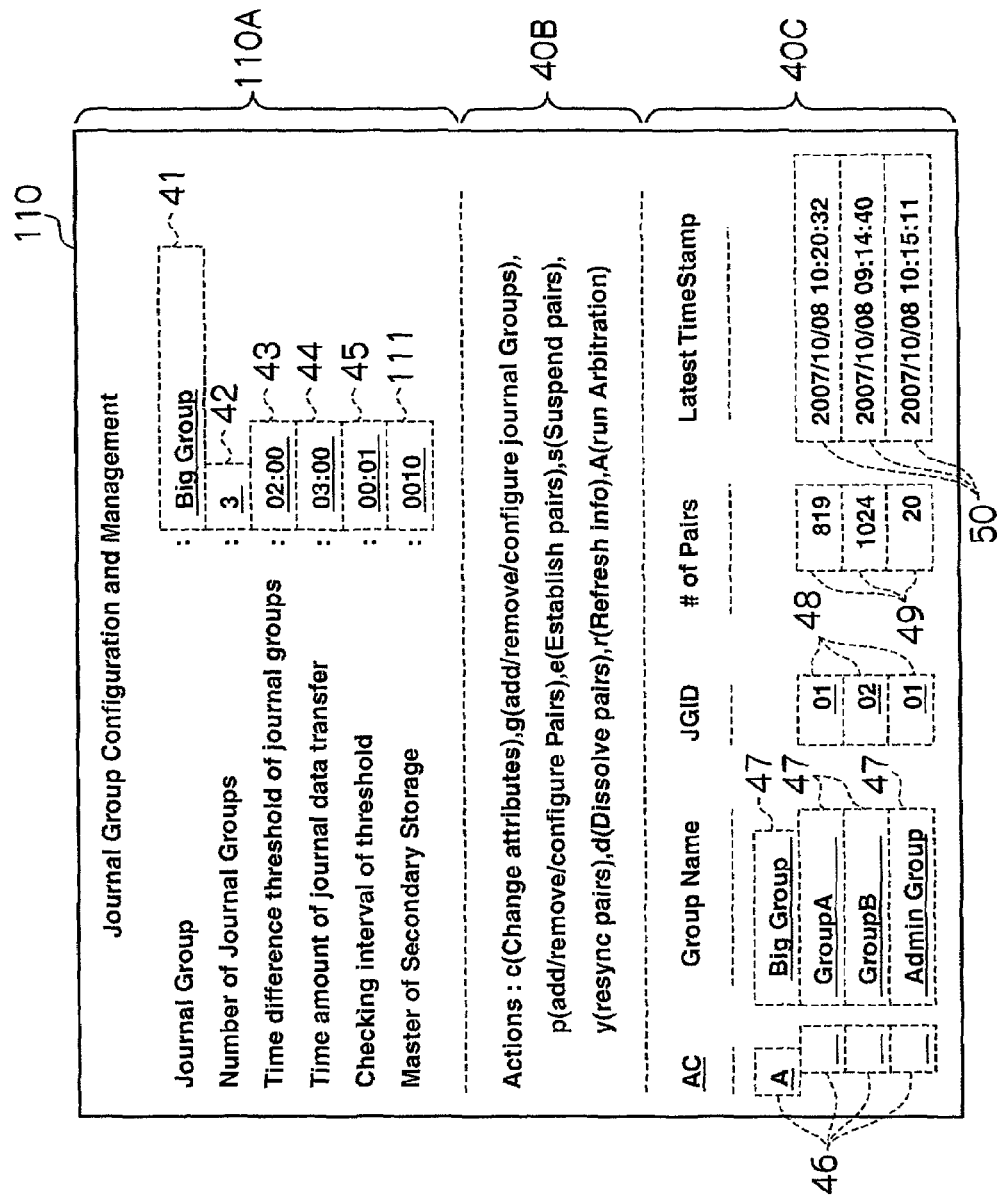
FIG. 15 is a schematic diagram schematically showing a configuration example of a journal group configuration/management screen according to the second embodiment.

As a result of activating the journal group pair formation program 100, the system administrator is able to display a journal group configuration/management screen 110 as shown in FIG. 15 on the monitor display of the host 91.

The journal group configuration/management screen 110 is a GUI screen to be used for configuring and managing the primary journal group 31A and the secondary journal group 31B, and is configured the same as the journal group configuration/management screen 40 according to the first embodiment explained with reference to FIG. 4 other than that a master secondary storage apparatus definition field 111 is provided to the journal group configuration field 40.

The system administrator is thereby able to designate either the first or second secondary storage apparatus 94, 95 as the master by inputting the device ID of the intended first or second secondary storage apparatus 94, 95 among the first and second secondary storage apparatuses 94, 95 into the master secondary storage apparatus definition field 111.

Figure 16:
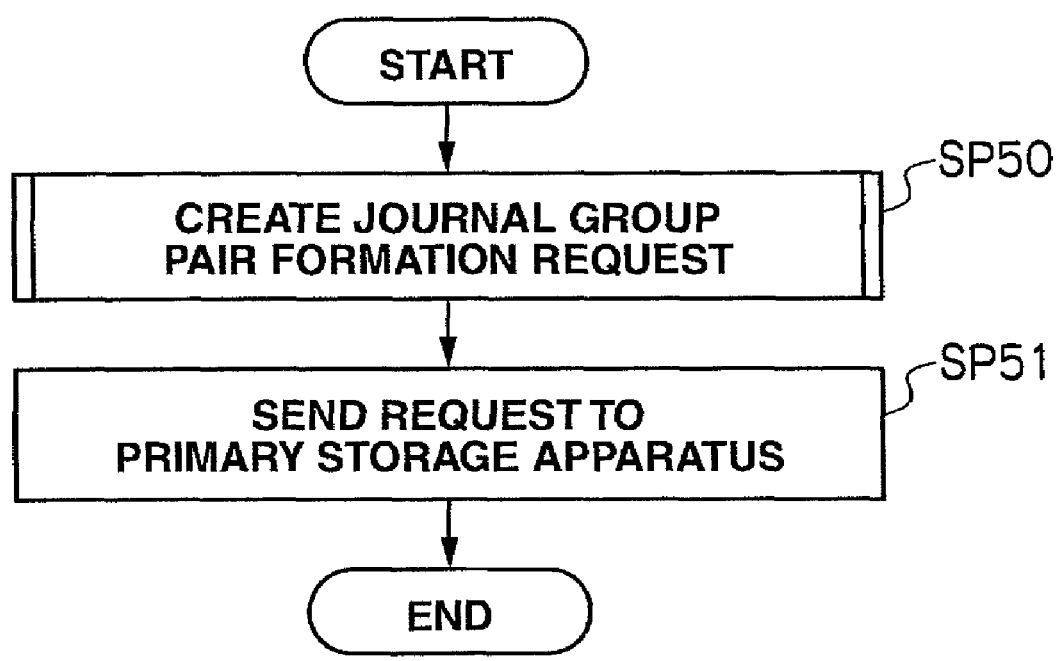
FIG. 16 is a flowchart showing the processing routine of journal group pair formation processing according to the second embodiment.

FIG. 16 shows the specific processing routine of the CPU 10 (FIG. 14) in the host 91 when creating a journal group pair according to the various definitions input in the journal group configuration/management screen 110 and the copy pair addition/removal screen 60 explained with reference to FIG. 5. The CPU 10 executes the journal group pair formation processing according to the journal group pair formation program 100 (FIG. 14) stored in the memory 11 (FIG. 14).

Figure 17:
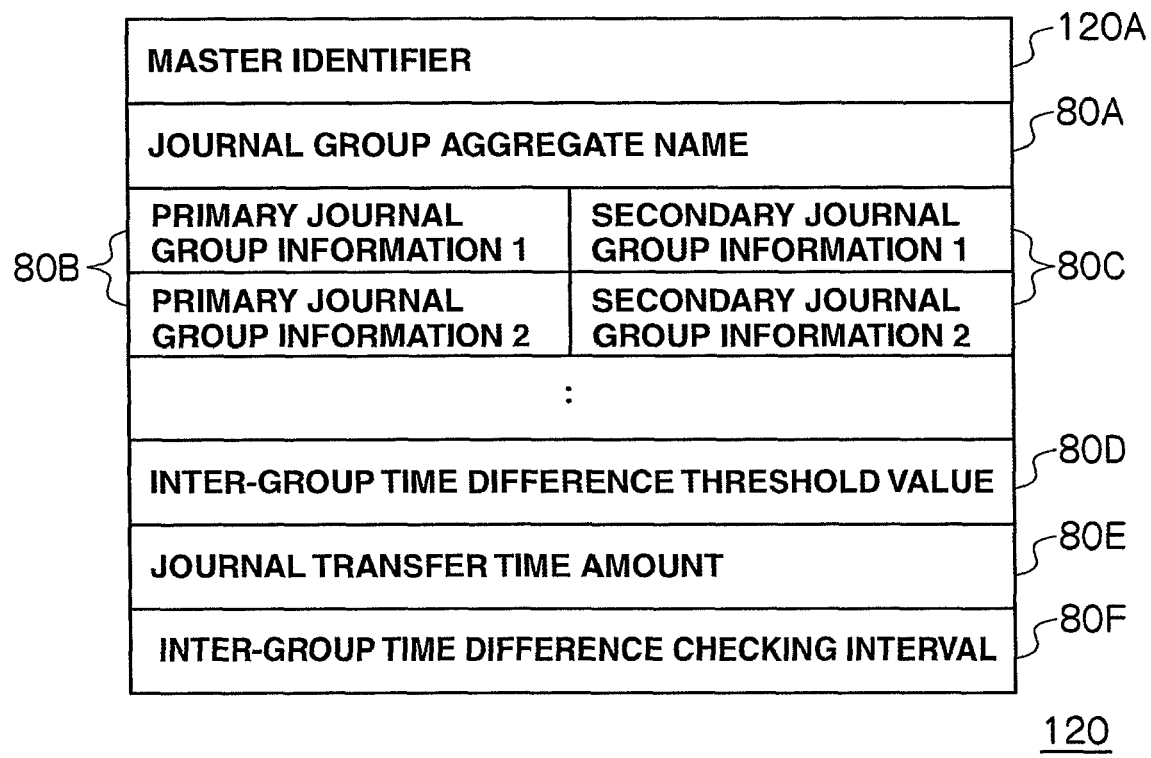
FIG. 17 is a conceptual diagram explaining a journal group pair formation request according to the second embodiment.

In other words, the CPU 10 starts the journal group pair formation processing after necessary information is input by the system administrator via the journal group configuration/management screen 110 explained with reference to FIG. 15 and the copy pair addition/removal screen 60 explained with reference to FIG. 5, and input for configuring the journal group pair is received, and foremost creates a journal group pair formation request 120 as shown in FIG. 17 based on the various types of information input by the system administrator in the journal group configuration/management screen 110 (SP50).

The journal group pair formation request 120 is configured the same as the journal group pair formation request 80 according to the first embodiment explained with reference to FIG. 7 excluding the point of comprising a master identifier field 120A. The master identifier field 120A stores the device ID of the first or second secondary storage apparatus 94, 95 designated as the master by the system administrator in the journal group configuration/management screen 110 among the first and second secondary storage apparatuses 94, 95.

Subsequently, the CPU 10 sends the created journal group pair formation request 120 to the corresponding first and/or second primary storage apparatus 92, 93 (SP51), and then ends this journal group pair formation processing.

Figure 18:
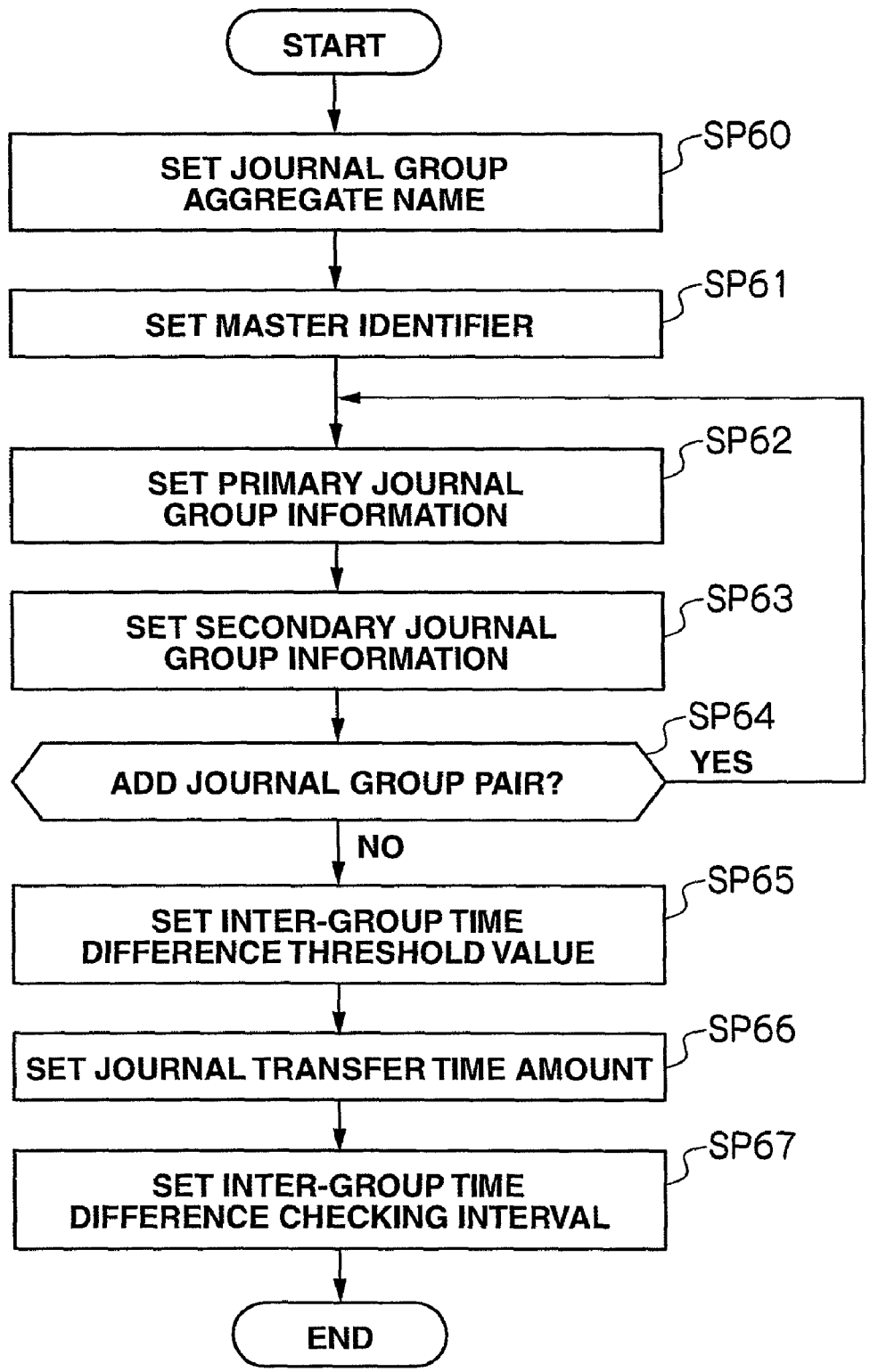
FIG. 18 is a flowchart showing the processing routine of journal group pair formation request creation processing according to the second embodiment.

The specific processing contents of the CPU 10 at step SP50 of the journal group pair formation processing are shown in FIG. 18. When the CPU 10 proceeds to step SP50 of the journal group pair formation processing, it foremost starts the journal group pair formation request creation processing shown in FIG. 18, and then stores the name of the new journal group aggregate defined by the system administrator with the journal group configuration/management screen 110 in the journal group aggregate name storage field 80A of the journal group pair formation request 120 (SP60).

The CPU 10 thereafter stores the device ID of the first or second secondary storage apparatus 94, 95 to become the master among the first and second secondary storage apparatuses 94, 95 designated by the system administrator in the journal group configuration/management screen 110 (FIG. 15) into the master identifier field 120A of the journal group pair formation request 120 (SP61).

Subsequently, the CPU 10 performs the processing of step SP62 to step SP67 as with the processing of step SP11 to step SP16 of the journal group pair formation request creation processing according to the first embodiment explained with reference to FIG. 9, thereby creates the journal group pair formation request 120 containing the device ID of the first or second storage apparatus 94, 95 to become the master among the first and second secondary storage apparatuses 94, 95, and then ends this journal group pair formation request creation processing.

Meanwhile, the channel adapter 101A (FIG. 14) of the first primary storage apparatus 92 that received the journal group pair formation request 120 executes the primary journal group formation processing explained with reference to FIG. 10 according to the copy processing program stored in an internal memory not shown, thereby forms a primary journal group 31A in the self storage apparatus, and sends the received journal group pair formation request 120 to the second primary storage apparatus 93 and the first secondary storage apparatus 94.

The channel adapter 101A of the second primary storage apparatus 93 that received the journal group pair formation request 120, as with the first primary storage apparatus 92, executes the primary journal group formation processing explained with reference to FIG. 10 according to the copy processing program stored in an internal memory not shown, thereby forms a primary journal group 31A in the self storage apparatus, and sends the received journal group pair formation request 120 to the second secondary storage apparatus 95.

Figure 19:
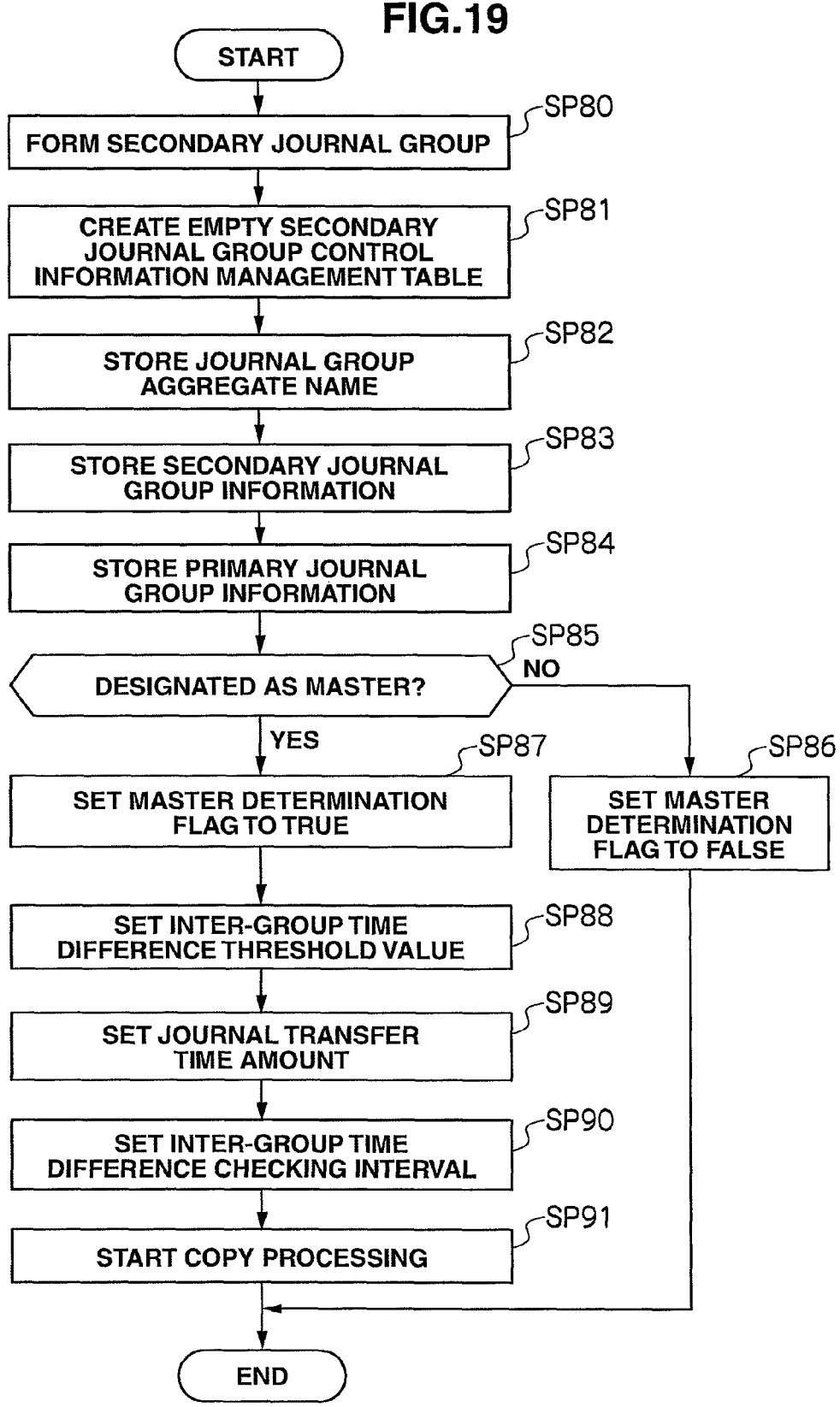
FIG. 19 is a flowchart showing the processing routine of secondary journal group formation processing according to the second embodiment.

The channel adapter 101B of the first and second secondary storage apparatuses 94, 95 that received the journal group pair formation request 120 executes the secondary journal group formation processing shown in FIG. 19 according to the copy processing program stored in an internal memory not shown.

In other words, when the channel adapter 101B receives the journal group pair formation request 120 from the first or second primary storage apparatus 92, 93, it starts the secondary journal group formation processing, and foremost reads the secondary journal group information stored in the respective secondary journal group information fields 80C of the received journal group pair formation request 120, and forms all necessary secondary journal groups based on the read secondary journal group information as with the processing at step SP20 of the primary journal group formation processing explained with reference to FIG. 10 (SP80).

Figure 20:
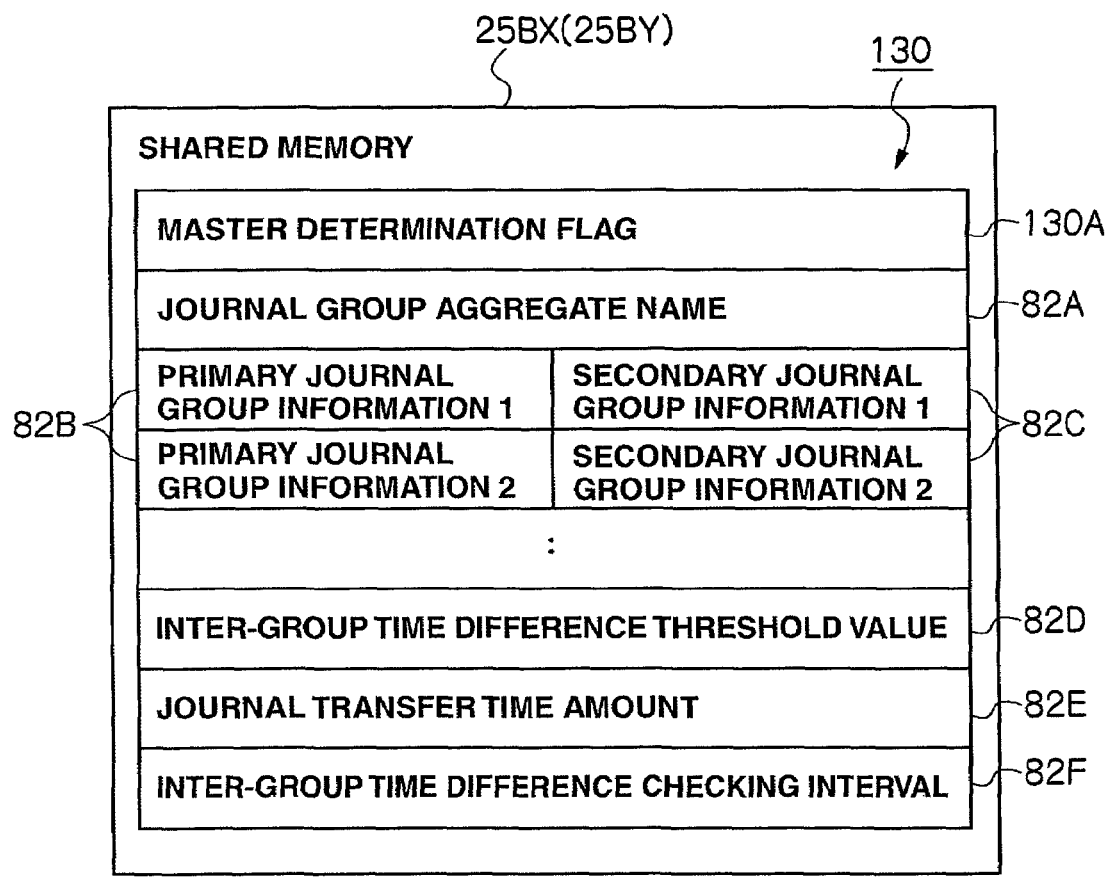
FIG. 20 is a conceptual diagram showing a secondary journal group control information management table according to the second embodiment.

Subsequently, the channel adapter 101B creates a secondary journal group control information management table 130 as shown in FIG. 20 that is not storing data in the shared memories 25BX, 25BY (SP81). The secondary journal group control information management table 130 is configured the same as the secondary journal group control information management table 82 according to the first embodiment explained with reference to FIG. 12 excluding the point of comprising a master determination flag storage field 130A.

The channel adapter 101B thereafter stores the name of the journal group aggregate, all secondary journal group information and all primary journal group information stored in the journal group pair formation request 120 into the secondary journal group control information management table 130 as with the processing at step SP32 to step SP34 of the secondary journal group formation processing explained with reference to FIG. 11 (SP82 to SP84).

Subsequently, the channel adapter 101B determines whether the self storage apparatus is designated as the master based on the device ID stored in the master identifier storage field 120A (FIG. 17) of the journal group pair formation request 120 (SP85).

When the channel adapter 101B obtains a negative result in this determination, it sets "false ("0")" in the master determination flag storage field 130A of the secondary journal group control information management table 130 (SP86), and then ends this secondary journal group formation processing. Accordingly, in the foregoing case, no data is stored in the inter-group time difference threshold value storage field 82D, the journal transfer time amount storage field 82E and the inter-group time difference checking interval storage field 82F of the secondary journal group control information management table 130.

Contrarily, when the channel adapter 101B obtains a positive result in this determination, it sets "true ("1")" in the master determination flag storage field 130A of the secondary journal group control information management table 130 (SP87).

The channel adapter 101B thereafter stores the inter-group time difference threshold value, the journal transfer time amount and the inter-group time difference checking interval contained in the journal group pair formation request 120 into the inter-group time difference threshold value storage field 82D, the journal transfer time amount storage field 82E and the inter-group time difference checking interval storage field 82F of the secondary journal group control information management table 120, respectively, as with the processing at step SP35 to step SP37 of the secondary journal group formation processing (FIG. 11) (SP88 to SP90). Accordingly, in the case of this embodiment, the inter-group time difference threshold value, the journal transfer time amount and the inter-group time difference checking interval will only be stored in the secondary journal group control information management table 130 of the first or second secondary storage apparatus 94, 95 designated to be the master by the system administrator.

Subsequently, the channel adapter 101B starts the remote copy processing by sending a journal transfer request to the corresponding first and/or second primary storage apparatus 92, 93 regarding the respective secondary journal groups 31B formed at step SP80 (SP91), and thereafter ends this secondary journal group formation processing.

When the channel adapter 101B starts the remote copy processing, it periodically sends the journal transfer request designating a journal identifier (sequence number) to the first and/or second primary storage apparatus 92, 93 regarding the respective secondary journal groups 31B, and reflects the journal 30 consequently transferred from the first and/or second primary storage apparatus 92, 93 to the corresponding data volume DVOL of the corresponding secondary journal group 31B.

Each time the channel adapter 101B receives a journal 30 from the first or second primary storage apparatus 92, 93, it updates the intra-group latest time stamp in the corresponding secondary journal group information of the corresponding secondary journal group control information management table 130 with the value of the time stamp stored in the acquired journal 30.

Figure 21:
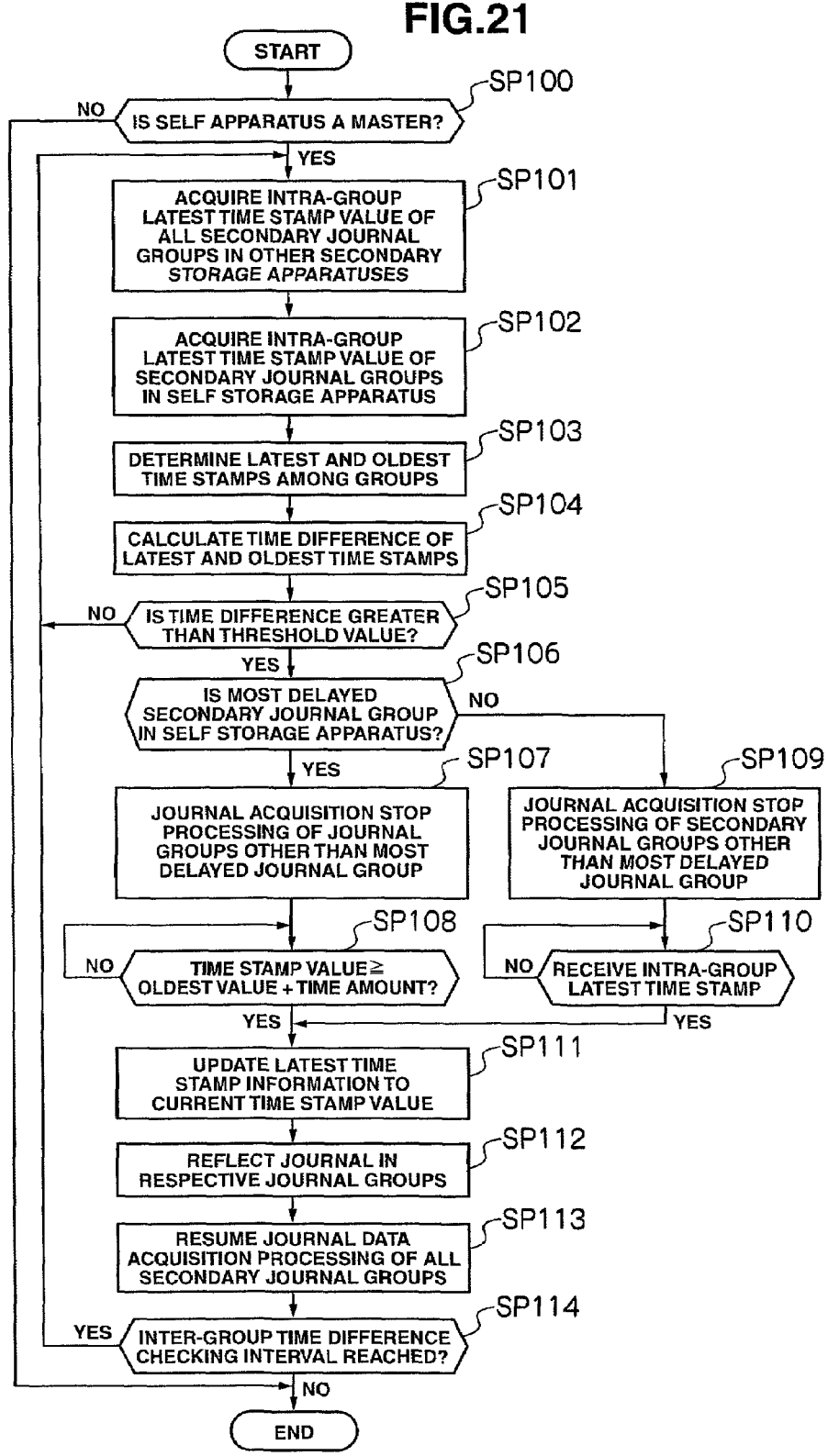
FIG. 21 is a flowchart showing the processing routine of journal transfer control processing according to the second embodiment.

Meanwhile, the channel adapter 101B of the first and second secondary storage apparatuses 94, 95 that started the remote copy processing, in parallel with such remote copy processing, executes the journal transfer control processing shown in FIG. 21 for each journal group aggregate according to the journal transfer control processing program stored in an internal memory not shown.

In other words, the channel adapter 101B starts the journal transfer control processing in the cycle of the inter-group time difference checking interval, and foremost determines whether the self storage apparatus is a master based on the master determination flag stored in the master determination flag storage field 130A (FIG. 20) of the secondary journal group control information management table 130 stored in the shared memories 25BX, 25BY (SP100).

When the channel adapter 101B obtains a negative result in this determination, it ends this journal transfer control processing.

Contrarily, when the channel adapter 101B obtains a positive result in this determination, it accesses the other second or first secondary storage apparatus 95, 94 and extracts the intra-group latest time stamp 81C (FIG. 8) of the secondary journal groups 31B regarding the respective secondary journal groups 31B in the second or first secondary storage apparatus 95, 94 (SP101).

The channel adapter 101B reads the respective intra-group latest time stamps 81C in the corresponding secondary journal group information stored in the secondary journal group control information management table 130 stored in the shared memories 25BX, 25BY of the self storage apparatus (SP102).

Subsequently, the channel adapter 101B calculates the time difference between the inter-group latest time stamp and the intra-group oldest time stamp for each journal group aggregate and determines whether the time difference is greater than the inter-group time difference threshold value stored in the secondary journal group control information management table 130 as with the processing at step SP41 to step SP43 of the journal transfer control processing according to the first embodiment explained with reference to FIG. 13 (SP103 to SP105).

When the channel adapter 101B obtains a negative result in this determination, it returns to step SP101, and thereafter repeats the same processing until it obtains a positive result at step SP105 (SP101 to SP105-SP101).

When the channel adapter 101B eventually obtains a positive result in this determination, it determines whether the secondary journal group 31B with the most delayed journal transfer is a secondary journal group 31B configured in the self storage apparatus (SP106).

When the channel adapter 101B obtains a positive result in this determination, it stops issuing the journal transfer request regarding all secondary journal groups 31B other than the secondary journal group 31B with the most delayed journal transfer in the self storage apparatus. Further, the channel adapter 101B commands the other second or first secondary storage apparatus 95, 94 to stop issuing the journal transfer request regarding all secondary journal groups 31B in the second or first secondary storage apparatus 95, 94 (SP107).

Subsequently, the channel adapter 101B thereafter updates the value of the intra-group latest time stamp contained in the secondary journal group information of the secondary journal group 31B stored in the secondary journal group control information management table 82 with the value of the time stamp contained in the journal 30 each time it acquires the journal 30 regarding the secondary journal group 31B with the most delayed journal transfer, and at the same time waits for the value of the intra-group latest time stamp to become greater than the total value of the value of the intra-group oldest time stamp determined at step SP103 and the journal transfer time amount set in the secondary journal group control information management table 130 (SP108).

When the channel adapter 101B eventually obtains a positive result in the determination at step SP108, it updates the value of the intra-group latest time stamp of the secondary journal group 31B in the secondary journal group control information management table 130 with the value of the time stamp contained in the latest journal 30 (SP111).

The channel adapter 101B thereafter concurrently reflects the journals 30 up to the time shown with the intra-group oldest time stamp in the respective secondary data volumes 31B in accordance with a new intra-group latest time stamp among the intra-group latest time stamps of the respective secondary journal groups 31B associated with the target journal group aggregate. In addition, the channel adapter 101B commands the other secondary storage apparatuses 95, 94 to concurrently reflect the journals 30 up to the time shown with the intra-group oldest time stamp in the respective secondary data volumes 31B in accordance with the intra-group oldest time stamp (SP112).

Subsequently, the channel adapter 101B resumes the acquisition processing of journals 30 regarding all secondary journal groups 31B in the self storage apparatus, commands the other second or first secondary storage apparatus 95, 94 to resume the acquisition processing of journals 30 regarding all secondary journal groups 31B in the second or first secondary storage apparatus 95, 94 (SP113), and thereafter determines whether the inter-group time difference checking interval has been reached since the start of this journal transfer control processing (SP114).

When the channel adapter 101B obtains a positive result in this determination, it returns to step SP101, and thereafter performs the same processing of step SP101 onward. Contrarily, when the channel adapter 101B obtains a negative result in this determination, it ends this journal transfer control processing.

Meanwhile, when the channel adapter 101B obtains a negative result in the determination at step SP106, it stops issuing the journal transfer request regarding all secondary journal groups 31B in the self storage apparatus. In addition, the channel adapter 101B issues a command to the other second or first secondary storage apparatus 95, 94 to acquire the journal 30 regarding the secondary journal group 31B with the most delayed journal transfer in the second or first secondary storage apparatus 95, 94 (hereinafter referred to as the "journal continuation acquisition command"), and a command for stopping the issuance of the journal transfer request regarding all secondary journal groups 31B other than the foregoing secondary journal group 31B (SP109). Here, the channel adapter 101B notifies the value of the intra-group latest time stamp of the secondary journal group 31B with the most delayed journal transfer acquired at step SP102 and the journal transfer time amount stored in the secondary journal group control information management table 130 to the second or first secondary storage apparatus 95, 94.

Subsequently, the channel adapter 101B, as explained later with reference to FIG. 22, waits to receive the value of the intra-group latest time stamp of the secondary journal group 31B with the most delayed journal transfer from the second or first secondary storage apparatus 95, 94 given the journal continuation acquisition command (SP110).

When the channel adapter 101B eventually receives the value of the intra-group latest time stamp of the secondary journal group 31B with the most delayed journal transfer from the second or first secondary storage apparatus 95, 94, it updates the value of the intra-group latest time stamp contained in the secondary journal group information regarding the secondary journal group 31B in the secondary journal group control information management table 130 with the value of the received intra-group latest time stamp (SP111).

The channel adapter 101B thereafter concurrently reflects the journals 30 up to the time shown with the intra-group oldest time stamp in the respective secondary data volumes 31B in accordance with a new intra-group latest time stamp among the intra-group latest time stamps of the respective secondary journal groups 31B associated with the target journal group aggregate. In addition, the channel adapter 101B commands the other secondary storage apparatuses 95, 94 to concurrently reflect the journals 30 up to the time shown with the intra-group oldest time stamp in the respective secondary data volumes 31B in accordance with the intra-group oldest time stamp (SP112).

Subsequently, the channel adapter 101B resumes the acquisition processing of journals 30 regarding all secondary journal groups 31B in the self storage apparatus, commands the other second or first secondary storage apparatus 95, 94 to resume the acquisition processing of journals 30 regarding all secondary journal groups 31B in the second or first secondary storage apparatus 95, 94 (SP113), and thereafter determines whether the inter-group time difference checking interval has been reached since the start of this journal transfer control processing (SP114).

When the channel adapter 101B obtains a positive result in this determination, it returns to step SP101, and thereafter performs the same processing of step SP101 onward. Contrarily, when the channel adapter 101B obtains a negative result in this determination, it ends this journal transfer control processing.

Figure 22:
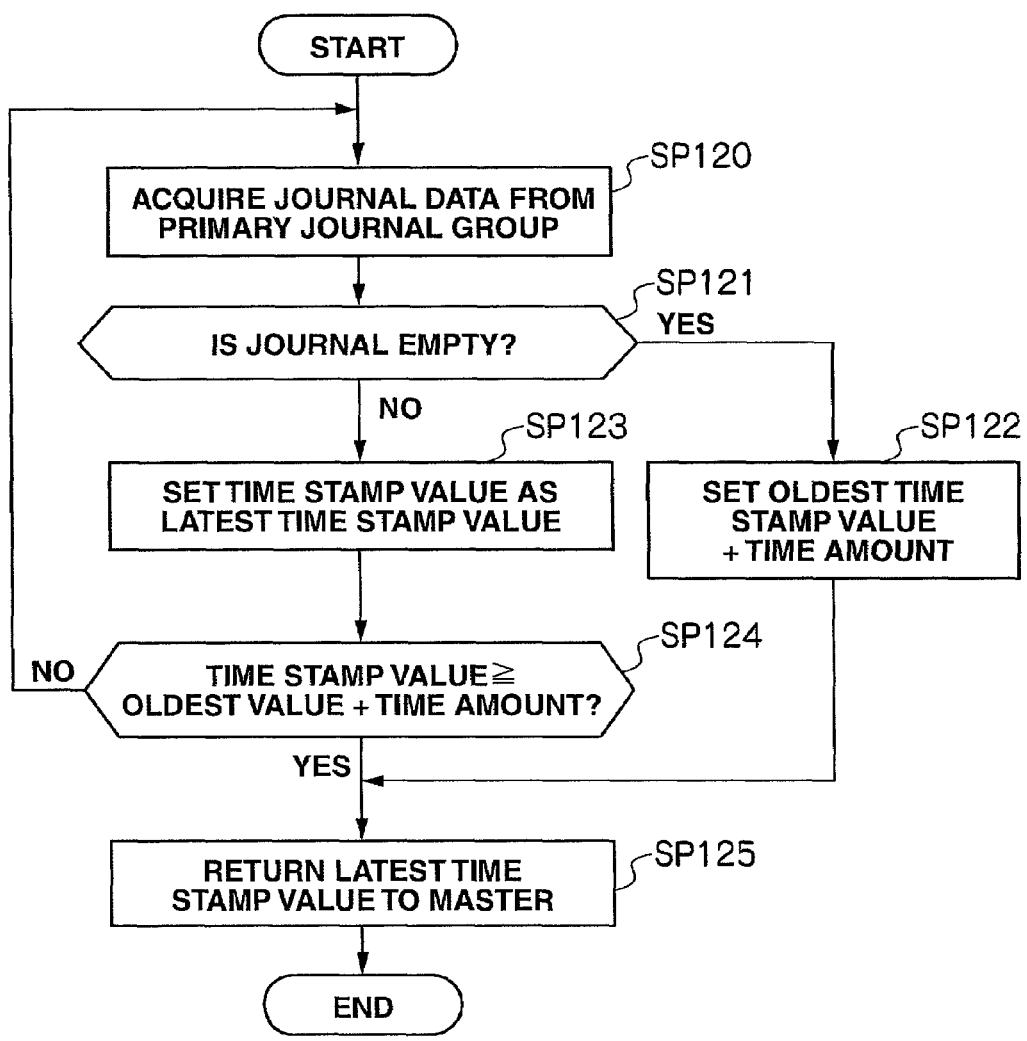
FIG. 22 is a flowchart showing journal continuation acquisition processing.

FIG. 22 shows the specific processing contents to be performed by the channel adapter 101B of the second or first secondary storage apparatus 95, 94 given the journal continuation acquisition command from the first or second secondary storage apparatus 94, 95 set as the master at step SP109 of FIG. 21. When the channel adapter 101B receives the journal continuation acquisition command, it executes the journal continuation acquisition processing shown in FIG. 22 according to the journal transfer control program stored in an internal memory.

In other words, when the channel adapter 101B receives the journal continuation acquisition command from the first or second secondary storage apparatus 94, 95 set as the master, it starts this journal continuation acquisition processing, and foremost acquires one journal 30 by sending the journal transfer request regarding the secondary journal group 31B with the most delayed journal transfer to the corresponding second or first primary storage apparatus 93, 92 (SP120).

Subsequently, the channel adapter 101B determines whether the acquired journal 30 is storing data (SP121). This is because the first and second primary storage apparatuses 92, 93 send a journal 30 storing a prescribed dummy data in substitute for the actual data to the first or second secondary storage apparatus 94, 95 upon receiving a journal transfer request in a state where there is no journal to be transferred, and, by determining whether the acquired journal 30 is storing data, it is possible to determine whether a journal 30 to be acquired is still remaining in the first or second primary storage apparatus 92, 93.

When the channel adapter 101B obtains a positive result in this determination, it updates the value of the intra-group latest time stamp in the corresponding secondary storage group information in the secondary journal group control information management table 130 stored in the shared memories 25BX, 25BY of the self storage apparatus with a value obtained by adding the intra-group latest time stamp value and the journal transfer time amount given together with the journal continuation acquisition command as explained with reference to step SP109 of FIG. 21 (SP122), and then proceeds to step SP125.

Contrarily, when the channel adapter 101B obtains a negative result in the determination at step SP121, it updates the value of the intra-group latest time stamp in the corresponding secondary storage group information in the secondary journal group control information management table 130 with the value of the time stamp contained in the journal 30 acquired at step SP120 (SP123).

Subsequently, the channel adapter 101B determines whether the value of the updated intra-group latest time stamp is greater than the value obtained by adding the intra-group latest time stamp value and the journal transfer time amount given together with the journal continuation acquisition command (SP124).

When the channel adapter 101B obtains a negative result in this determination, it returns to step SP120, and thereafter repeats the same processing until it obtains a positive result at step SP124 (SP120 to SP124-SP120).

When the channel adapter 101B eventually obtains a positive result at step SP124, it reads the value of the intra-group latest time stamp of the secondary journal group 31B that received the journal continuation acquisition command from the secondary journal group control information management table 130, notifies this to the first or second secondary storage apparatus 94, 95 set as the master (SP125), and then ends this journal continuation acquisition processing.

As described above, with the storage system 90 according to the present embodiment, the first or second secondary storage apparatus 94, 95 set as the master among the first and second secondary storage apparatuses 94, 95 monitors the intra-group latest time stamp of the respective secondary journal groups 31B configured in the self storage apparatus and the other second or first secondary storage apparatus 95, 94 for each journal group aggregate, and performs control processing for discontinuing the journal transfer regarding the secondary journal groups 31B other than the secondary journal group 31B with the most delayed journal transfer when the time difference exceeds the inter-group time difference threshold value. The first or second secondary storage apparatus 94, 95 set as the master thereafter acquires journals 30 regarding the secondary journal group 31B with the most delayed journal transfer from the corresponding first or second primary storage apparatus 92, 93 in the amount of the journal transfer time amount, and then reflects this in the journals 30 of the respective secondary journal groups 31B in the other second or first secondary storage apparatus 95, 94.

Thus, according to the storage system 90, as with the storage system 1 of the first embodiment, it is possible to guarantee the consistency that ensures the up-to-dateness of data between the respective secondary journal groups 31B within a given time frame (inter-group time difference threshold value) between the secondary journal groups 31B regardless of the number of secondary journal groups 31B to be subject to remote copy, and it is thereby possible to provide a highly reliable storage system.

In addition, with the storage system 90 also, as with the storage system I of the first embodiment, since the system administrator is able to using the host 91 to set the inter-group time difference checking interval, the inter-group time difference threshold value and the journal transfer time amount, the present invention also yields an effect of improving the operational flexibility in addition to the foregoing effect.

(3) Other Embodiments

Although the foregoing first embodiment explained a case of configuring the first storage unit for providing a first volume (data volume DVOL) to be used for reading and writing data with one primary storage apparatus 3 and configuring the second storage unit for providing a second volume (data volume DVOL) to be used for replicating the data written into the first volume with one secondary storage apparatus 5, and the foregoing second embodiment explained a case of configuring the first storage unit with two primary storage apparatuses 92, 93 and configuring the second storage unit with two secondary storage apparatuses 94, 95, the present invention is not limited to the foregoing configuration, and the first storage unit or the second storage unit may be configured from three or more storage apparatuses.

In addition, although the foregoing first and second embodiments explained a case of equipping the channel adapter 23A with a function as the journal creation unit for configuring the primary journal group 31A (first group) and creating a journal when data is written into the data volume DVOL for each of the configured primary journal groups A31 in the primary storage apparatuses 3, 92, 93, the present invention is not limited to the foregoing configuration, and such function may be loaded in other circuit blocks.

Similarly, although the foregoing first and second embodiments explained a case of equipping one channel adapter 23A with a function as the journal acquisition reflection unit for configuring a plurality of secondary journal groups 31B respectively including in correspondence with the respective primary journal groups 31A, acquiring the journals 30 from the primary storage apparatuses 3, 92, 93 periodically and in the order the journals were created for each of the configured secondary journal groups 31B, and reflecting the acquired journals 30 in the corresponding data volume DVOL in the corresponding secondary journal group 31B, a function as the time difference detection unit for comparing the latest time stamp of each of the secondary journal groups 31B contained in the journals 30 retained in the data volume DVOL in an unreflected state, and detecting the time difference of the latest and oldest time stamps, and a function as the journal acquisition control unit for executing prescribed control processing for acquiring the journals 30 regarding the secondary journal group 31B with the oldest time stamp in preference to the journal regarding other secondary journal groups 31B when the time difference exceeds a preset threshold value (inter-group time difference threshold value) in the secondary storage apparatuses 5, 94, 95, the present invention is not limited to the foregoing configuration, and these functions may be partially or entirely loaded in other circuit blocks.

The present invention can be broadly applied to storage systems that perform remote copy of data between a storage apparatus installed at an operation base and a storage apparatus installed at a remote base.

What is claimed is:
1. A storage system, comprising:
a first storage unit configured from a plurality of storage apparatuses for providing to a host system a plurality of first volumes to be used for reading and writing data; and
a second storage unit configured from a plurality of storage apparatuses for providing a plurality of second volumes to be used for replicating data written into said first volumes;
wherein said first storage unit includes:
a journal creation unit for configuring a plurality of first groups including said first volumes and, when data is written into said first volumes, creating a journal containing said data and a time stamp showing the time said data was written for each of said configured first groups; and
wherein said second storage unit includes:
a journal acquisition reflection unit for configuring a plurality of second groups respectively including said second volumes corresponding to said first groups, respectively, acquiring said journals from said first storage apparatus periodically and in the order said journals were created for each of said configured second groups, and reflecting the acquired journals in the corresponding second volume in the corresponding second group;
a master apparatus set unit for selecting and setting one of said storage apparatuses configuring said second storage unit as a master apparatus that controls the other storage apparatuses in said second storage unit, as designated by a user, wherein said master apparatus:
acquires said journal corresponding to said master apparatus as well as said journal corresponding to said storage apparatuses other than the master apparatus in said second storage unit;
compares the latest time stamp of each of said second groups contained in said journals retained in said second volume in an unreflected state, and detects the time difference of the latest and oldest time stamps; and
executes prescribed control processing for acquiring said journals regarding said second group with the oldest time stamp in preference to said journals regarding other second groups when said time difference exceeds a preset threshold value,
wherein the updating of the latest time stamp for purposes of minimizing the update time difference between journal volumes in the journal groups in order to equalize the times of data accumulated in the journal volumes is conducted using the value of the time stamp contained in the latest journal at a time when the value of the latest time stamp to become greater than the total value of the value of the oldest time stamp and a stored journal transfer time amount.

2. The storage system according to claim 1,
wherein said master apparatus set unit of said second storage unit periodically compares the latest time stamp for each of said second groups.

3. The storage system according to claim 2,
wherein said host system displays a setting screen for arbitrarily setting the cycle for said master apparatus to compare the latest time stamp for each of said second groups, and notifies the designated value designated in said setting screen to said second storage unit via said first storage unit; and
wherein said second storage unit sets said designated value designated in said setting screen notified from said host system as the cycle for said master apparatus to compare the latest time stamp for each of said second groups.

4. The storage system according to claim 1,
wherein said master apparatus of said second storage unit gives preference to the acquisition of said journals regarding said second group and stops the acquisition of said journals regarding the second groups other than said second group until it acquires said journals regarding said second group with the oldest time stamp up to a predetermined prescribed journal amount.

5. The storage system according to claim 4,
wherein said second storage unit sets said designated value designated in said setting screen notified from said host system as said journal amount.

6. The storage system according to claim 1,
wherein said master apparatus is a single preset storage apparatus among said plurality of storage apparatuses.

7. The storage system according to claim 1,
wherein said host system displays a setting screen for arbitrarily setting said threshold value of said time difference to be detected by said master apparatus, and notifies the designated value designated in said setting screen to said second storage unit via said first storage unit; and
wherein said second storage unit sets said designated value designated in said setting screen notified from said host system as said threshold value of said time difference to be detected by said master apparatus.

8. A remote copy control method of a storage system comprising a first storage unit configured from a plurality of storage apparatuses for providing to a host system a plurality of first volumes to be used for reading and writing data, and a second storage unit configured from a plurality of storage apparatuses for providing a plurality of second volumes to be used for replicating data written into said first volumes, comprising:
a first step of configuring a plurality of first groups including said first volumes and, when data is written into said first volumes, creating a journal containing said data and a time stamp showing the time said data was written for each of said configured first groups; and
a second step of configuring a plurality of second groups, including said second volumes corresponding to said first groups, respectively. acquiring said journals from said first storage apparatus periodically and in the order said journals were created for each of said configured second groups, and reflecting the acquired journals in the corresponding second volume in the corresponding second group;
a third step of selecting and setting one of said storage apparatuses configuring said second storage unit as a master apparatus that controls the other storage apparatuses in said second storage unit, as designated by a user; and
a fourth step of comparing the latest time stamp of each of said second groups containing said journals retained in said second volumes in an unreflected state, and detecting the time difference of the latest and oldest time stamps; and executing prescribed control processing for acquiring said journals regarding said second group with the oldest time stamp in preference to said journals regarding other second groups when said time difference exceeds a preset threshold value,
wherein the updating of the latest time stamp for purposes of minimizing the update time difference between journal volumes in the journal groups in order to equalize the times of data accumulated in the journal volumes is conducted using the value of the time stamp contained in the latest journal at a time when the value of the latest time stamp to become greater than the total value of the value of the oldest time stamp and a stored journal transfer time amount.

9. The remote copy control method according to claim 8,
wherein, at said fourth step, the latest time stamp for each of said second groups is periodically compared.

10. The remote copy control method according to claim 9,
wherein said host system displays a setting screen for arbitrarily setting the cycle for comparing the latest time stamp for each of said second groups at said fourth step, and notifies the designated value designated in said setting screen to said second storage unit via said first storage unit; and
wherein said second storage unit sets said designated value designated in said setting screen notified from said host system as the cycle for comparing the latest time stamp for each of said second groups at said fourth step.

11. The remote copy control method according to claim 9,
wherein, at said fourth step, preference is given to the acquisition of said journals regarding said second group until said journals regarding said second group with the oldest time stamp is acquired up to a predetermined prescribed journal amount.

12. The remote copy control method according to claim 11,
wherein said host system displays a setting screen for arbitrarily setting said journal amount, and notifies the designated value designated in said setting screen to said second storage unit via said first storage unit; and wherein said second storage unit sets said designated value designated in said setting screen notified from said host system as said journal amount.

13. The remote copy control method according to claim 8, wherein, at said fourth step, a single preset storage apparatus among said plurality of storage apparatuses, which is designated by a user as a master apparatus, executes prescribed control processing for comparing the latest time stamp of each of said second groups containing said journals retained in said second volume in an unreflected state, and detecting the time difference of the latest and oldest time stamps; and acquiring said journals regarding said second group with the oldest time stamp in preference to said journals regarding other second groups when said time difference exceeds a preset threshold value.

14. The remote copy control method according to claim 8, wherein said host system displays a setting screen for arbitrarily setting said threshold value of said time difference to be detected at said fourth step, and notifies the designated value designated in said setting screen to said second storage unit via said first storage unit; and
wherein said second storage unit sets said designated value designated in said setting screen notified from said host system as said threshold value of said time difference.

* * * * *